United States Patent
Chien et al.

(10) Patent No.: US 9,319,716 B2
(45) Date of Patent: Apr. 19, 2016

(54) PERFORMING MOTION VECTOR PREDICTION FOR VIDEO CODING

(75) Inventors: Wei-Jung Chien, San Diego, CA (US); Peisong Chen, San Diego, CA (US); Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 769 days.

(21) Appl. No.: 13/351,980

(22) Filed: Jan. 17, 2012

(65) Prior Publication Data

US 2012/0195368 A1      Aug. 2, 2012

Related U.S. Application Data

(60) Provisional application No. 61/436,997, filed on Jan. 27, 2011, provisional application No. 61/449,985, filed on Mar. 7, 2011, provisional application No. 61/561,601, filed on Nov. 18, 2011.

(51) Int. Cl.
  H04N 7/12      (2006.01)
  H04N 11/02     (2006.01)
  H04N 11/04     (2006.01)
  (Continued)

(52) U.S. Cl.
  CPC ............ *H04N 19/895* (2014.11); *H04N 19/46* (2014.11); *H04N 19/51* (2014.11); *H04N 19/52* (2014.11); *H04N 19/61* (2014.11); *H04N 19/70* (2014.11)

(58) Field of Classification Search
  CPC ....................................................... H04N 7/50
  USPC ......................................... 375/240.12–240.16
  See application file for complete search history.

(56) References Cited

U.S. PATENT DOCUMENTS 6,584,155 B2    6/2003   Takeda et al.
6,671,321 B1    12/2003  Ohtani et al.
(Continued)

FOREIGN PATENT DOCUMENTS

JP    2012151576 A    8/2012
JP    2013141077 A    7/2013
(Continued)

OTHER PUBLICATIONS

Jung, et al., "Proposition for robust parsing with temporal predictor," Document JCTVC-D197, Revision 1, 4th Meeting: Daegu, KR, Jan. 20-28, 2011, 6 pp.
(Continued)

*Primary Examiner* — Chikaodili E Anyikire
(74) *Attorney, Agent, or Firm* — Shumaker & Sieffert, P.A.

(57) ABSTRACT

In general, techniques are described for performing motion vector prediction for video coding. An apparatus comprising a motion compensation unit may implement the techniques. The motion compensation unit determines spatial candidate motion vectors (MVPs) associated with a current portion of a video frame and prunes the spatial candidate motion vectors to remove duplicates without removing a temporal candidate motion vector. The motion compensation unit selects one of the temporal candidate motion vector or one of the spatial candidate motion vectors remaining after pruning as a selected candidate motion vector based on a motion vector predictor (MVP) index signaled in a bitstream and performs motion compensation based on the selected candidate motion vector.

57 Claims, 6 Drawing Sheets

(51) Int. Cl.
*H04N 19/895* (2014.01)
*H04N 19/52* (2014.01)
*H04N 19/70* (2014.01)
*H04N 19/46* (2014.01)
*H04N 19/51* (2014.01)
*H04N 19/61* (2014.01)

(56) References Cited

U.S. PATENT DOCUMENTS

| | | | |
|---|---|---|---|
| 7,408,986 | B2 | 8/2008 | Winder |
| 7,471,724 | B2 | 12/2008 | Lee |
| 7,499,491 | B2 | 3/2009 | Lee et al. |
| 7,567,617 | B2 | 7/2009 | Holcomb |
| 2004/0001546 | A1 | 1/2004 | Tourapis et al. |
| 2005/0232499 | A1 | 10/2005 | Ha et al. |
| 2008/0144716 | A1 | 6/2008 | De Haan |
| 2009/0304084 | A1* | 12/2009 | Hallapuro et al. ....... 375/240.16 |
| 2011/0194609 | A1* | 8/2011 | Rusert et al. ............ 375/240.16 |

FOREIGN PATENT DOCUMENTS

| | | |
|---|---|---|
| RU | 2310231 C2 | 11/2007 |
| WO | 2009115901 A2 | 9/2009 |
| WO | 2010046854 A1 | 4/2010 |
| WO | 2012093585 A1 | 7/2012 |

OTHER PUBLICATIONS

Jung et al., "Proposition for Robust Parsing With Temporal Predictor," JCTVC-D197, 4th Meeting: Daegu, KR, Jan. 20-28, 2011, 5 pp.
Su et al., "On Motion Vector Competition," JCRVC-C257, 3rd Meeting: Guangzhou, CN, Oct. 7-15, 2010, 3 pp.
Yang et al., "Motion video coding with selection of an optimal predictive motion vector", Optical Engineering, vol. 48, Jan. 22, 2009, 3 pgs.
Anonymous, "Test Model under Consideration," Joint Collaborative Team on Video Coding, JCTVC-B205, Jul. 21-28, 2010, 152 pp.
International Search Report and Written Opinion—PCT/US2012/021742—ISA/EPO—May 15, 2012, 22 pp.
Lin et al., "Improved Advanced Motion Vector Prediction," Joint Collaborative Team on Video Coding, JCTVC-D125, Jan. 20-28, 2011, 8 pp.
Lin et al., "Syntax for AMVP Parsing Error Control", Joint Collaborative Team on Video Coding, JCTVC-D126, Jan. 20-28, 2011, 3 pp.
Li et al., "Constrained temporal motion vector prediction for error resilience", Joint Collaborative Team on Video Coding, JCTVC-D139, Jan. 20-28, 2011, 3 pp.
Invitation to Pay Additional Fees—PCT/US2012/021742—ISA/EPO—Mar. 16, 2012—8 pp.
Tan et al., "Merge/Skip/Direct Simplification", Joint Collaborative Team on Video Coding, JCTVC-D051, Jan. 20-28, 2011, 4 pp.
Wang et al., "Error Control and Concealment for Video Communication: A Review", Proceedings of the IEEE, vol. 86, No. 5, May 1, 1998, 24 pp.

International Preliminary Report on Patentability—PCT/US20121021742, The International Bureau of WIPO—Geneva, Switzerland, May 15, 2013, 45 pp.
Second Written Opinion—PCT/US2012/021742, The International Bureau of WIPO—Geneva, Switzerland, Feb. 4, 2013, 13 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011,193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 2011, JCTVC-G1103_d2, 214 pp.
Bross et al., "High efficiency video coding (HEVC) text specification draft 6," 7th Meeting: Geneva, CH, Nov. 21-30, 2011, JCTVC-H1003, 259 pp.
Bross et al., "High efficiency video coding (HEVC) text specification draft 7," 9th Meeting: Geneva, CH, Apr. 27-May 7, 2012, JCTVC-I1003_d21, 290 pp.
Bross et al., "High efficiency video coding (HEVC) text specification draft 8," 10th Meeting: Stockholm, SE, Jul. 11-20, 2012, JCTVC-J1003_d7, 261 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Response to Written Opinion dated May 15, 2012, from international patent application No. PCT/US2012/021742, filed Nov. 2, 2012, 45 pp.
Second Written Opinion from international patent application No. PCT/US2012/021742, dated Feb. 4, 2013, 13 pp.
Bossen, et al, Simplified motion vector coding method, Joint Collaborative Team on Video Coding (JCT-VC)of ITU-T SG16 WP3 and ISO/IEC JTC1/SC29NVG11JCTVC-B09 4, Retreived from the internet: <http://wftp3.itu.int/av-arch/jctvc-site/2010_07_B_Geneva/JCTVC-B094.doc>, Jul. 2010, 5 pp.
Park, et al., "Improvements on median motion vectors of AMVP[online]," JCTVC-D095, Jan. 14, 2011,URL,http://phenix.it-sudparis.eu/jct/doc_end_user/documents/4_Daegu/wg11/JCTVC-D095-v1.zip, 7 pp.
Office Action from Japanese Application No. 2013-552014, dated Jul. 29, 2014, 6 pp.
Office Action from Ukraine Application No. 2412-197685UA/1111, dated Jun. 5, 2014, 11 pp.
Fujibayashi, et al., "CE9 3.2d Simplified Motion vector prediction" JCTVC-D231, Joint Collaborative Team on Video Coding (JCT-VC) of ITU-T SG16 WP3 and ISO/IEC JTC1/SC291WG11, 4th Meeting: Daegu, Korea, Jan. 20-28, 2011, 5pps.

* cited by examiner

PERFORMING MOTION VECTOR PREDICTION FOR VIDEO CODING

This application claims the benefit of U.S. Provisional Application No. 61/436,997, filed Jan. 27, 2011, U.S. Provisional Application No. 61/449,985, filed Mar. 7, 2011 and U.S. Provisional Application No. 61/561,601, filed Nov. 18, 2011, each of which is hereby incorporated by reference in its entirety.

TECHNICAL FIELD

This disclosure relates to video coding and, more particularly, motion compensation aspects of video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), and extensions of such standards, to transmit and receive digital video information more efficiently. New video coding standards, such as the High Efficiency Video Coding (HEVC) standard being developed by the "Joint Collaborative Team-Video Coding" (JCT-VC), which is a collaboration between MPEG and ITU-T, are being developed. The emerging HEVC standard is sometimes referred to as H.265, although such a designation has not formally been made.

SUMMARY

In general, this disclosure describes techniques for specifying motion vector predictors (MVPs). MVPs are commonly employed in video coding as a way of improving the efficiency with which motion compensation is performed. Rather than perform a search for blocks in reference frames that match a current block, the video encoder may select a motion vector for the current block from a list of MVPs. In some examples, the list of MVPs may include motion vectors from four blocks that are spatial neighbors to the current block, and a motion vector from a co-located block from a reference frame is temporally before or after the current frame. The selected one of the MVPs is then used for the current block, reducing if not eliminating the process of motion compensation.

In one example, a method of encoding video data comprises determining spatial candidate motion vectors associated with a current portion of a current video frame, wherein the spatial candidate motion vectors comprise motion vectors determined for neighboring portions of the current video frame adjacent to the current portion, pruning the spatial candidate motion vectors to remove at least one of the spatial candidate motion vectors and determining a temporal candidate motion vector associated with the current portion of the current video frame. The temporal candidate motion vector comprises a motion vector determined for a portion of a reference video frame. The method also comprises selecting the temporal candidate motion vector or one of the spatial candidate motion vectors remaining after pruning as a selected candidate motion vector and signaling the selected candidate motion vector in a bitstream.

In another example, an apparatus for encoding video data comprises means for determining spatial candidate motion vectors associated with current portion of a current video frame, wherein the spatial candidate motion vectors comprise motion vectors determined for neighboring portions of the current video frame adjacent to the current portion, means for pruning the spatial candidate motion vectors to at least one of the spatial candidate motion vectors and means for determining a temporal candidate motion vector associated with the current portion of the current video frame. The temporal candidate motion vector comprises a motion vector determined for a portion of a reference video frame. The apparatus further comprises means for selecting the temporal candidate motion vector or one of the spatial candidate motion vectors remaining after pruning as a selected candidate motion vector and means for signaling the selected candidate motion vector in a bitstream.

In another example, an apparatus for encoding video data comprises a motion compensation unit that determines spatial candidate motion vectors associated with current portion of a current video frame, wherein the spatial candidate motion vectors comprise motion vectors determined for neighboring portions of the current video frame adjacent to the current portion, prunes the spatial candidate motion vectors to remove at least one of the spatial candidate motion vectors, and determines a temporal candidate motion vector associated with the current portion of the current video frame. The temporal candidate motion vector comprises a motion vector determined for a portion of a reference video frame. The apparatus also comprises a mode selection unit that selects the temporal candidate motion vector or one of the spatial candidate motion vectors remaining after pruning as a selected candidate motion vector and an entropy coding unit that signals the selected candidate motion vector in a bitstream.

In another example, a non-transitory computer-readable medium comprises instructions that, when executed, cause one or more processors to determine spatial candidate motion vectors associated with current portion of a current video frame, wherein the spatial candidate motion vectors comprise motion vectors determined for neighboring portions of the current video frame adjacent to the current portion, prune the spatial candidate motion vectors to remove at least one of the spatial candidate motion vectors, determine a temporal candidate motion vector associated with the current portion of the current video frame, wherein the temporal candidate motion vector comprises a motion vector determined for a portion of a reference video frame, select the temporal candidate motion vector or one of the spatial candidate motion vectors remaining after pruning as a selected candidate motion vector, and signal the selected candidate motion vector in a bitstream.

In another example, a method of decoding video data comprises determining spatial candidate motion vectors associated with a current portion of a current video frame, wherein the spatial candidate motion vectors comprise motion vectors determined for neighboring portions of the current video frame adjacent to the current portion and pruning the spatial candidate motion vectors to remove at least one of the spatial candidate motion vectors without removing a temporal candidate motion vector determined for the current portion of the current video frame. The temporal candidate motion vector comprises a motion vector determined for a portion of a reference video frame co-located in a same location of the reference video frame as the current portion is in the current video frame. The method also comprises selecting one of the temporal candidate motion vector or one of the spatial candidate motion vectors remaining after pruning as a selected candidate motion vector based on a motion vector predictor (MVP) index signaled in a bitstream and performing motion compensation based on the selected candidate motion vector.

In another example, an apparatus for decoding video data comprises means for determining spatial candidate motion vectors associated with a current portion of a current video frame, wherein the spatial candidate motion vectors comprise motion vectors determined for neighboring portions of the current video frame adjacent to the current portion and means for pruning the spatial candidate motion vectors to remove at least one of the spatial candidate motion vectors without removing a temporal candidate motion vector determined for the current portion of the current video frame. The temporal candidate motion vector comprises a motion vector determined for a portion of a reference video frame. The apparatus also comprises means for selecting one of the temporal candidate motion vector or one of the spatial candidate motion vectors remaining after pruning as a selected candidate motion vector based on a motion vector predictor (MVP) index signaled in a bitstream and means for performing motion compensation based on the selected candidate motion vector.

In another example, an apparatus for decoding video data comprises a motion compensation unit that determines spatial candidate motion vectors associated with a current portion of a current video frame, wherein the spatial candidate motion vectors comprise motion vectors determined for neighboring portions of the current video frame adjacent to the current portion, prunes the spatial candidate motion vectors to remove at least one of the spatial candidate motion vectors without removing a temporal candidate motion vector determined for the current portion of the current video frame, wherein the temporal candidate motion vector comprises a motion vector determined for a portion of a reference video frame, selects one of the temporal candidate motion vector or one of the spatial candidate motion vectors remaining after pruning as a selected candidate motion vector based on a motion vector predictor (MVP) index signaled in a bitstream and performs motion compensation based on the selected candidate motion vector.

In another example, a non-transitory computer-readable medium comprises instructions that, when executed, cause one or more processors to determine spatial candidate motion vectors associated with a current portion of a current video frame, wherein the spatial candidate motion vectors comprise motion vectors determined for neighboring portions of the current video frame adjacent to the current portion, prune the spatial candidate motion vectors to remove at least one of the spatial candidate motion vectors without removing a temporal candidate motion vector determined for the current portion of the current video frame, wherein the temporal candidate motion vector comprises a motion vector determined for a portion of a reference video frame, select one of the temporal candidate motion vector or one of the spatial candidate motion vectors remaining after pruning as a selected candidate motion vector based on a motion vector predictor (MVP) index signaled in a bitstream and perform motion compensation based on the selected candidate motion vector.

The details of one or more examples are set forth in the accompanying drawings and the description below. Other features, objects, and advantages will be apparent from the description and drawings, and from the claims.

DETAILED DESCRIPTION

Embodiments of the techniques described in this disclosure enable video encoders to specify MVPs in a robust, but efficient manner, by pruning redundant spatial MVPs without including the temporally co-located MVP during the pruning process. In other words, the techniques form an intermediate list of MVPs that includes only the spatial MVPs, perform pruning with respect to this intermediate list of MVPs and then add the temporally co-located MVP to the pruned intermediate list of MVPs to form the pruned list of MVPs. In this manner, loss of the reference frame specifying the temporally co-located MVP may not prevent parsing of the bitstream, as is common in conventional systems, and coding efficiency gains enabled through application of the pruning process can still be maintained.

Figure 1:
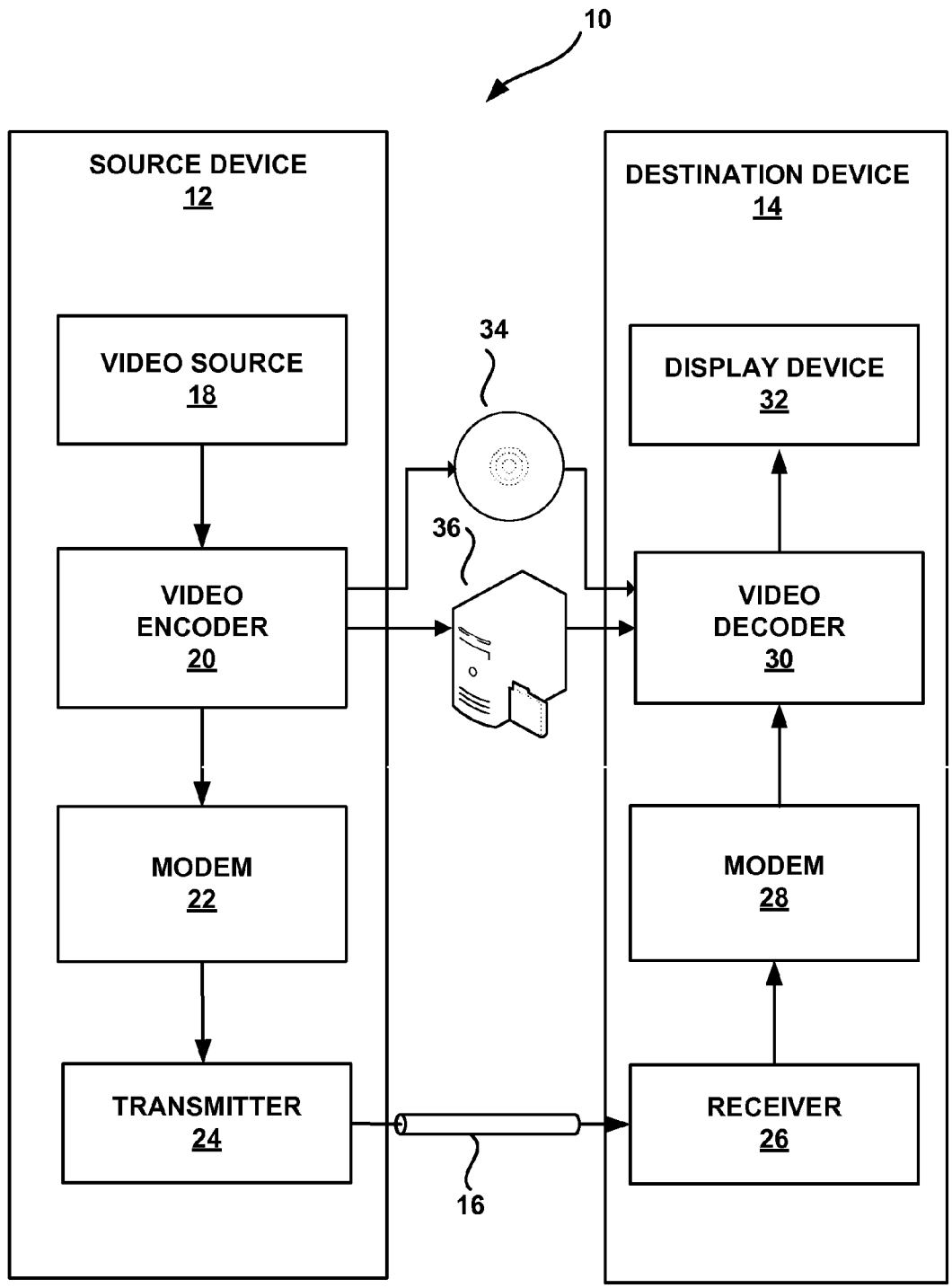
FIG. 1 is a block diagram illustrating an example video encoding and decoding system that may be configured to utilize the techniques described in this disclosure for specifying motion vector predictors (MVPs).

FIG. 1 is a block diagram illustrating an example video encoding and decoding system 10 that may be configured to utilize the techniques described in this disclosure for specifying motion vector predictors (MVPs). As shown in the example of FIG. 1, system 10 includes a source device 12 that generates encoded video for decoding by destination device 14. Source device 12 may transmit the encoded video to destination device 14 via communication channel 16 or may store the encoded video on a storage medium 34 or a file server 36, such that the encoded video may be accessed by the destination device 14 as desired. Source device 12 and destination device 14 may comprise any of a wide variety of devices, including desktop computers, notebook (i.e., laptop) computers, tablet computers, set-top boxes, telephone handsets (including cellular telephones or handsets and so-called smartphones), televisions, cameras, display devices, digital media players, video gaming consoles, or the like.

In many cases, such devices may be equipped for wireless communication. Hence, communication channel 16 may comprise a wireless channel. Alternatively, communication channel 16 may comprise a wired channel, a combination of wireless and wired channels or any other type of communication channel or combination of communication channels suitable for transmission of encoded video data, such as a radio frequency (RF) spectrum or one or more physical transmission lines. In some examples, communication channel 16 may form part of a packet-based network, such as a local area network (LAN), a wide-area network (WAN), or a global network such as the Internet. Communication channel 16, therefore, generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

As further shown in the example of FIG. 1, source device 12 includes a video source 18, video encoder 20, a modulator/demodulator 22 ("modem 22") and a transmitter 24. In source device 12, video source 18 may include a source such as a video capture device. The video capture device, by way of example, may include one or more of a video camera, a video archive containing previously captured video, a video feed interface to receive video from a video content provider, and/or a computer graphics system for generating computer graphics data as the source video. As one example, if video source 18 is a video camera, source device 12 and destination device 14 may form so-called camera phones or video phones. The techniques described in this disclosure, however, are not limited to wireless applications or settings, and may be applied to non-wireless devices including video encoding and/or decoding capabilities. Source device 12 and destination device 14 are, therefore, merely examples of coding devices that can support the techniques described herein.

Video encoder 20 may encode the captured, pre-captured, or computer-generated video. Once encoded, video encoder 20 may output this encoded video to modem 22. Modem 22 may then modulate the encoded video according to a communication standard, such as a wireless communication protocol, whereupon transmitter 24 may transmit the modulated encoded video data to destination device 14. Modem 22 may include various mixers, filters, amplifiers or other components designed for signal modulation. Transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later retrieval, decoding and consumption. The storage medium 34 may include Blu-ray discs, DVDs, CD-ROMs, flash memory, or any other suitable digital storage media for storing encoded video. Destination device 14 may access the encoded video stored on the storage medium 34 or the file server 36, decode this encoded video to generate decoded video and playback this decoded video.

File server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. Destination device 14 may access file server 36 in accordance with any standard data connection, including an Internet connection. This connection may include a wireless channel (e.g., a Wi-Fi connection or wireless cellular data connection), a wired connection (e.g., DSL, cable modem, etc.), a combination of both wired and wireless channels or any other type of communication channel suitable for accessing encoded video data stored on a file server.

Destination device 14, in the example of FIG. 1, includes a receiver 26, a modem 28, a video decoder 30, and a display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding the associated encoded video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 of destination device 14 represents any type of display capable of presenting video data for consumption by a viewer. Although shown as integrated with destination device 14, display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

This disclosure may generally refer to video encoder 20 "signaling" the syntax information to another device, such as video decoder 30. It should be understood, however, that video encoder 20 may signal information by associating the syntax elements with various encoded portions of video data. That is, video encoder 20 may "signal" data by storing certain syntax elements to headers of various encoded portions of video data. In some cases, such syntax elements may be encoded and stored (e.g., stored to storage medium 34 or file server 36) prior to being received and decoded by video decoder 30. Thus, the term "signaling" may generally refer to the communication of syntax or other data used to decode the compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

HM refers to a block of video data as a coding unit (CU). In general, a CU has a similar purpose to a macroblock coded according to H.264, except that a CU does not have the size distinction associated with the macroblocks of H.264. Thus, a CU may be split into sub-CUs. In general, references in this disclosure to a CU may refer to a largest coding unit (LCU) of a picture or a sub-CU of an LCU. For example, syntax data within a bitstream may define the LCU, which is a largest coding unit in terms of the number of pixels. An LCU may be split into sub-CUs, and each sub-CU may be split into sub-CUs. Syntax data for a bitstream may define a maximum number of times an LCU may be split, referred to as a maximum CU depth. Accordingly, a bitstream may also define a smallest coding unit (SCU).

An LCU may be associated with a hierarchical quadtree data structure. In general, a quadtree data structure includes one node per CU, where a root node corresponds to the LCU. If a CU is split into four sub-CUs, the node corresponding to the CU includes a reference for each of four nodes that correspond to the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining one or more motion vectors for the PU. A motion vector generally identifies a co-located CU in one or more reference frames, where the term "reference frame" refers to a frame that occurs temporally before or after the frame in which the PU is located. Data for the CU defining the PU(s) may also describe, for example, partitioning of the CU into one or more PUs. Partitioning modes may differ between whether the CU is uncoded, intra-prediction mode encoded, or inter-prediction mode encoded.

The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, a prediction direction that identifies whether the identified reference frame is before or after the current frame, and/or a reference list (e.g., list 0 or list 1) for the motion vector. Alternatively, the data defining the motion vector may describe the motion vector in terms of what is referred to as a motion vector predictor (MVP). A motion vector predictor may include a motion vector of a neighboring PU or a temporally co-located PU. Typically, a list of five MVPs is formed in a defined manner (such as, listing the MVPs starting with those having the greatest amplitude to those having the least amplitude, i.e., greatest or least displacement between the current PU to be coded and the reference PU, or listing the MVPs based on the location, i.e. above blocks, left blocks, corner blocks, temporal blocks), where four of the five MVPs are spatial MVPs selected from four neighboring PUs and the fifth MVP is a temporally co-located MVP selected from a temporally co-located PU in the reference frame.

While typically the temporal candidate motion vector is co-located in the same portion of the reference frame as that of the current portion in the current frame, the techniques should not be limited strictly to co-located temporal candidate motion vectors. Instead, the techniques may be implemented with respect to any temporal candidate motion vector whether co-located or not. In some instances, the video encoder may identify a temporal candidate motion vector that is not co-located with the current block or portion of the current frame and select this temporal candidate emotion vector as the temporal MVP. Commonly, the video encoder may signal that a non-co-located temporal MVP is used or, in some instances, a given context may indicate that a non-co-located temporal MVP is used (in which case the video encoder may not signal whether or not a non-co-located temporal MVP was selected).

After forming the list of five MVPs, video encoder 20 may assess each of the MVPs to determine which provides the best rate and distortion characteristics that best match a given rate and distortion profile selected for encoding the video. Video encoder 20 may perform a rate-distortion optimization (RDO) procedure with respect to each of the five MVPs, selecting the one of the MVPs having the best RDO results. Alternatively, video encoder 20 may select one of the five MVPs stored to the list that best approximates a motion vector determined for the current PU.

In any event, video encoder 20 may specify the motion vector using data that comprises an index identifying the selected one of the MVPs in the list of five MVPs, one or more reference frames to which the motion vector points (often in list form) and a prediction direction identifying whether the prediction is unidirectional or bi-directional. Alternatively, the data defining the motion vector may only specify the index of the selected MVP in the list of five MVPs without specifying the reference frame and the prediction direction, which signals to video decoders that the selected one of the MVP is to be used in its entirety for the current PU.

In addition to having one or more PUs that define one or more motion vectors, a CU may include one or more transform units (TUs). Following prediction using a PU, a video encoder may calculate a residual value for the portion of the CU corresponding to the PU, where this residual value may also be referred to as residual data. The residual value may be transformed, quantized, and scanned. A TU is not necessarily limited to the size of a PU. Thus, TUs may be larger or smaller than corresponding PUs for the same CU. In some examples, the maximum size of a TU may be the size of the corresponding CU. This disclosure also uses the term "block" to refer to any one or combination of a CU, PU, and/or TU.

In general, encoded video data may include prediction data and residual data. Video encoder 20 may produce the prediction data during an intra-prediction mode or an inter-prediction mode. Intra-prediction generally involves predicting the pixel values in a block of a picture relative to reference samples in neighboring, previously coded blocks of the same picture. Inter-prediction generally involves predicting the pixel values in a block of a picture relative to data of a previously coded picture.

Following intra- or inter-prediction, video encoder 20 may calculate residual pixel values for the block. The residual values generally correspond to differences between the predicted pixel value data for the block and the true pixel value data of the block. For example, the residual values may include pixel difference values indicating differences between coded pixels and predictive pixels. In some examples, the coded pixels may be associated with a block of pixels to be coded, and the predictive pixels may be associated with one or more blocks of pixels used to predict the coded block.

To further compress the residual value of a block, the residual value may be transformed into a set of transform coefficients that compact as much data (also referred to as "energy") as possible into as few coefficients as possible. Transform techniques may comprise a discrete cosine transform (DCT) process or conceptually similar process, integer transforms, wavelet transforms, or other types of transforms. The transform converts the residual values of the pixels from the spatial domain to a transform domain. The transform coefficients correspond to a two-dimensional matrix of coefficients that is ordinarily the same size as the original block. In other words, there are just as many transform coefficients as pixels in the original block. However, due to the transform, many of the transform coefficients may have values equal to zero.

Video encoder 20 may then quantize the transform coefficients to further compress the video data. Quantization generally involves mapping values within a relatively large range to values in a relatively small range, thus reducing the amount of data needed to represent the quantized transform coefficients. More specifically, quantization may be applied according to a quantization parameter (QP), which may be defined at the LCU level. Accordingly, the same level of quantization may be applied to all transform coefficients in the TUs associated with different PUs of CUs within an LCU. However, rather than signal the QP itself, a change (i.e., a delta) in the QP may be signaled with the LCU. The delta QP defines a change in the quantization parameter for the LCU relative to some reference QP, such as the QP of a previously communicated LCU.

Following quantization, video encoder 20 may scan the transform coefficients, producing a one-dimensional vector from the two-dimensional matrix including the quantized transform coefficients. Video encoder 20 may then perform statistical lossless encoding (which is commonly referred to by the misnomer "entropy encoding") to encode the resulting array to even further compress the data. In general, entropy coding comprises one or more processes that collectively compress a sequence of quantized transform coefficients and/or other syntax information. For example, syntax elements, such as the delta QPs, prediction vectors, coding modes, filters, offsets, or other information, may also be included in the entropy coded bitstream. The scanned coefficients are then entropy coded along with any syntax information, e.g., via content adaptive variable length coding (CAVLC), context adaptive binary arithmetic coding (CABAC), or any other statistical lossless coding process.

As noted above, the data defining the motion vectors for PUs may take a number of forms. Video encoder 20 may implement different ways by which motion vectors may be expressed to compress motion vector data. Video encoder 20 may implement what is referred to as a merge mode to express motion vectors as an index identifying a MVP as stored to a list of MVPs constructed in a defined manner. Video decoder 30, in implementing the inverse of this merge mode, receives this index, reconstructs the list of five MVPs according to the defined manner and selects the one of the five MVPs in the list indicated by the index. Video decoder 30 then instantiates the selected one of the MVPs as a motion vector for the associated PU at the same resolution of the selected one of the MVPs and that points to the same reference frame to which the selected one of the MVPs points. In implementing the merge mode, video encoder 20 may not need to perform motion estimation to the full extent necessary to derive a motion vector, specify horizontal and vertical components of the motion vector, the motion vector resolution, the motion vector direction (meaning, whether the motion vector points to a frame temporally before or after the current frame) or the reference frame index, thereby potentially reducing processor cycles required to determine a motion vector and compressing motion vector data.

Video encoder 20 may also implement an adaptive motion vector prediction (AMVP) mode that, similar to merge mode, includes expressing motion vectors as an index identifying a MVP as stored to a list of MVPs constructed in the defined manner. However, contrary to the merge mode, video encoder 20 may also specify the prediction direction and the reference frame, effectively overriding these portions of the selected one of the MVPs. In implementing the AMVP mode, video encoder 20 may not need to perform motion estimation to the full extent necessary to derive a motion vector, specify horizontal and vertical components of the motion vector, and the motion vector resolution, thereby potentially reducing processor cycles required to determine a motion vector and compressing motion vector data.

As various coding standards have evolved, even more efficient representations of motion vectors have evolved. For example, proposals to the emerging HEVC standards have suggested ways by which the MVP index may be compressed through a process referred to as "pruning" or "MVP pruning" In performing this pruning process, video encoder 20 constructs the list of five MVPs in the define manner and then prunes or removes any redundant MVPs. That is, video encoder 20 may remove any MVPs having the same amplitude on both the X and Y components and reference the same reference frame, where these MVPs are considered as "redundant MVPs" in this disclosure. Alternatively, video encoder 20 may only add MVPs to the list that are "unique," meaning that these MVPs have a different amplitudes in the X and Y direction than every other MVP already included in the list and/or reference a different reference frame. Whether pruned after being added to the list or pruned when creating the list, the pruning process may reduce the size of the list with the result that less bits may be used to signal or otherwise specify the selected one of the MVPs, because a shorter list generally requires a smaller number of bits to express the greatest index value.

For example, assume for purposes of illustration that none of the five MVPs are pruned. In this case, video encoder may signal an index into this list of five MVPs, to indicate a particular MVP to be selected, using a truncated unary code that comprises at most four bits. In the proposals, the truncated unary code used to signal selection of the fifth MVP in the list of five MVPs is 1111, the fourth MVP in the list of five MVPs is 1110, the third MVP in the list of five MVPs is 110, the second MVP in the list of five MVPs is 10, and the first MVP in the list of five MVPs is 0. If, however, the list of MVPs can be pruned to three MVPs (meaning that two of the MVPs are redundant), video encoder 20 may use a truncated unary code that consumes at most two bits (e.g., where the third MVP may be signaled using a code of 11), saving potentially one bit over instances where pruning is not employed or possible (such as when there are no redundant MVPs) and the fifth or fourth MVP in the list of five MVPs is selected. To some extent, therefore, the code depends on the size of the list of MVPs, where a smaller list of MVPs (meaning a list with fewer MVPs) results in a smaller code (meaning the code requires less bits to express the selected MVP from the pruned list of MVPs).

While pruning may improve coding efficiency by reducing code lengths used to signal an index of a selected MVP in the list of MVPs, this pruning may also impact the ability of video decoder 30 to successfully parse the bitstream. Because the code depends on the size of the pruned list of MVPs, video decoder 30 needs to know the number of MVPs that are in the pruned list of MVPs. However, when the reference frame from which the temporally co-located MVP is lost, this temporally co-located MVP is unavailable and video decoder 30 cannot determine whether this MVP is unique or redundant. As a result, video decoder 30 cannot determine whether the pruned list of MVPs would have included this temporally co-located MVP and, therefore, cannot determine the size of the pruned list of MVPs. Unable to determine the size of the pruned list of MVP, video decoder 30 then cannot determine a maximum length for the code, which in turn prevents video decoder 30 from being able to parse the code from the bitstream.

In accordance with the techniques described in this disclosure, video encoder 20 may specify MVPs in a potentially robust, but efficient manner by pruning redundant spatial MVPs without including the temporally co-located MVP during the pruning process. In other words, video encoder 20 may implement the techniques described in this disclosure to form an intermediate list of MVPs that includes only the spatial MVPs, perform pruning with respect to this intermediate list of MVPs and then combine the temporally co-located MVP with the pruned intermediate list of MVPs to form the pruned list of MVPs. In this manner, loss of the reference frame specifying the temporally co-located MVP may not prevent parsing of the bitstream, as is common in conventional systems, while still maintaining at least some of the coding efficiency gains enabled by employing the pruning process.

To illustrate, video encoder 20 first determines spatial candidate motion vectors associated with a current portion, such as a CU, of a current video frame. Again, the spatial candidate motion vectors include neighboring motion vectors determined for neighboring PUs adjacent to the current PU associated with the corresponding CU. Typically, these neighboring PU are located adjacent to the current PU on the left, above and to the left, directly above and above and to the right, as is shown in more detail with respect to the example of FIG. 6. Video encoder 20 uses these spatial candidate motion vectors, as these spatial candidate motion vectors have already been determined for these blocks. For any blocks located directly to the right or below the current PU, video encoder 20 has yet to compute a motion vector for these blocks considering that video encoder 20 generally performs motion estimation/compensation from top-to-bottom, left-to-right. However, while described with respect to these spatial motion vectors, the techniques may be implemented in video encoders 20 that perform motion estimation/compensation in a different order (e.g., top-to-bottom, right-to-left). In addition, the techniques may be implemented with respect to more or less spatial or temporal motion vectors.

After determining these spatial motion vectors, video encoder 20 then prunes the spatial candidate motion vectors to remove duplicate ones of the spatial candidate motion vectors. Video encoder 20 may identify duplicate spatial candidate motion vectors as any of the candidate spatial motion vectors having the same amplitude for both the x-axis and y-axis components of the candidate motion vectors and that come from the same reference frame. Video encoder 20 performs pruning either by removing duplicates from what may be referred to as an intermediate list of spatial candidate motion vectors or only adding a candidate spatial motion vector to this intermediate list upon determining that the candidate spatial motion vector to be added to this list is not a duplicate.

After pruning the spatial candidate motion vectors in this manner, video encoder 20 may then determine a temporal candidate motion vector for the current PU of the current video frame. Again, the temporal candidate motion vector comprises a motion vector determined for a PU of a reference video frame co-located in a same location as the current PU in the current video frame. Video encoder 20 may then select the temporal candidate motion vector or one of the spatial candidate motion vectors remaining after performing the pruning process as a selected candidate motion vector. Video encoder 20 then signals the selected candidate motion vector in the bitstream.

In some instances, video encoder 20 may determine whether each of the determined spatial candidate motion vectors are either spatially predicted or temporally predicted. In other words, the determined spatial candidate motion vectors themselves may be temporally predicted from a co-located block in a reference frame or spatially predicted from a block adjacent to the block for which each of the spatial candidate motion vectors are determined. Video encoder 20 may, in response to this determination, further remove one or more of the determined spatial candidate motion vectors from the pruning process. Video encoder 20 may, for example, remove those of the spatial candidate motion vectors that are determined to be themselves temporally predicted from the pruning process, as these temporally predicted spatial candidate motion vectors may be unavailable to the decoder should the portion of the reference frame from which these temporally predicted spatial candidate motion vectors are predicted is lost. Video encoder 20 may then select the temporal candidate motion vectors, one of the temporally predicted spatial candidate motion vectors or one of the spatially predicted spatial candidate motion vectors remaining after pruning and signal this selected candidate motion vector in the bitstream.

Alternatively, video encoder 20 may, rather than remove temporally predicted spatial candidate motion vectors from the pruning process, replace these temporally predicted spatial candidate motion vectors with default candidate motion vectors defining default motion information. This default motion vector information may comprise, for example, a motion vector amplitude, a prediction direction identifying whether the reference frame precedes or follows the current frame temporally, and a reference index identifying the reference frame. Video encoder 20 may determine this default motion vector information by taking an average of those available spatially predicted spatial candidate motion vectors, picking the first available spatially predicted spatial candidate motion vector, or using a default motion vector information that is statically configured within both video encoder 20 and video decoder 30, to name a few examples.

By eliminating those of the spatial candidate motion vectors that may be lost or unavailable to video decoder 30 (e.g., due to errors in transmission of the compressed video data or storage errors at either video encoder 20 or video decoder 30) from the pruning process, video encoder 20 may signal the selected candidate motion vector in such a manner that enables video decoder 30 to properly parse the bitstream in the event that these temporally predicted spatial candidate motion vectors are lost or become unavailable. Likewise, in the alternative, by replacing temporally predicted spatial candidate motion vectors with a default candidate motion vector, video encoder 20 may signal the selected candidate motion vector in such a manner that enables video decoder 30 to properly parse the bitstream in the event that these temporally predicted spatial candidate motion vectors are lost or become unavailable.

Typically, video encoder 20 signals the selected candidate motion vector using a unary code representative of an index of the selected candidate motion vector as arranged in a list. Video encoder 20 may arrange the temporal candidate motion vector and the spatial candidate motion vectors remaining after performing the pruning process in a set or defined manner (e.g., from highest amplitude to lowest amplitude, lowest amplitude to highest amplitude, temporal motion vector first followed by the remaining spatial motion vectors ordered from either highest to lowest amplitude or lowest to highest amplitude, etc.), forming a list of candidate motion vectors. Alternatively, video encoder 20 may signal some identifier indicating how the motion vectors are arranged in the list. Regardless, video encoder 20 then identifies the one of the candidate motion vectors stored to this list, encoding the index of the selected one of the candidate motion vectors as stored to this list using a unary code in the manner described above.

Video decoder 30 receives this bitstream, decodes the index and forms the intermediate list of spatial candidate motion vectors if available. As noted above, one or more of the spatial candidate motion vectors may not be available in instances where video encoder 20 employed motion vector prediction to encode the motion vector for the neighboring block and selected the temporal motion vector, where the reference frame defining this temporal motion vector was lost (e.g., due to memory corruption, a bus error or a transmission error). Alternatively, one or more of the spatial candidate motion vectors may not be available when video encoder 20 employed motion vector prediction to encode the motion vector for this neighboring PU and selected one of the spatial motion vectors which itself was motion vector predicted from the temporal motion vector, where the reference frame defining this temporal motion vector was lost (e.g., due to memory corruption, a bus error or a transmission error). Video decoder 30 may overcome this issue by either removing the unavailable temporally predicted candidate motion vectors from the pruning process or, in the alternative, replacing these unavailable temporally predicted spatial candidate motion vectors with a default candidate motion vector. Video decoder 30 in this respect implements the techniques described above with respect to video encoder 20 in a substantially similar manner so as to properly parse the signaled selected candidate motion vector from the bitstream.

In any event, even assuming one or more candidate motion vectors are lost, the techniques enable MVPs to be signaled in a way that facilitates parsing of the bitstream. By ensuring that the temporal candidate motion vector is always present in the list after pruning, video encoder 20 ensures that video decoder 30 can determine the number of available motion vectors and thereby parse the index from the bitstream. Likewise, by ensuring that temporally predicted spatial candidate motion vectors are always in the list or replaced with default candidate motion vectors that video decoder 30 can always reproduce, video encoder 20 ensures that video decoder 30 can determine the number of available motion vectors and thereby parse the index from the bitstream. In this way, even if the slice storing the temporal candidate motion vector and/or the temporally predicted spatial candidate motion vector is lost, video decoder 30 may still parse the bitstream regardless of whether unary codes are used. In particular, video decoder 30 can parse the bitstream with the knowledge that the temporal candidate motion vector and/or the temporally predicted spatial candidate motion vectors is always included in the MVP list and is never pruned from the MVP list. In the alternative, where temporally predicted spatial candidate motion vectors are replaced by default candidate motion vectors, video encoder 20 effectively ensures that such temporally predicted spatial candidate motion vectors cannot be lost, as video decoder 30 is configured in such a manner as to always be able to determine these motion vectors using the same techniques video encoder 20 performed to determine this default candidate motion vector.

To illustrate an instance where a temporal candidate motion vector is lost, consider an instance where the amplitudes of the spatial candidate motion vectors are 1, 1, 1, and 1 and the amplitude of the temporal candidate motion vector is −1. Video decoder 30 may implement the techniques to form a list, which may be referred to as an MVP list, with just the spatial candidate motion vectors at first such that the MVP list is 1, 1, 1 and 1. The decoder then prunes this spatial-only MVP list such that this MVP list is defined as 1. The decoder then adds the temporal candidate motion vector to the MVP list such that the MVP list is defined as −1 and 1. The encoder may then signal an mvp_idx of either 0 or 1 to indicate that one of these motion vectors was selected (or an mvp_idx of 0 and 10 if not using a truncated unary code). With respect to the unary codes described above, the techniques of this disclosure removes the possibility of having to infer that only one candidate motion vector was available after pruning because there will always be at least one spatial candidate motion vector and the temporal candidate spatial motion vector.

In this manner, the techniques enable video encoders to specify MVPs in a potentially robust, but efficient manner by pruning redundant spatial MVPs without considering the temporally co-located MVP during the pruning process. In other words, the techniques form an intermediate list of MVPs that includes only the spatial MVPs, perform pruning with respect to this intermediate list of MVPs and then add the temporally co-located MVP to the pruned intermediate list of MVPs to form the pruned list of MVPs. In this manner, loss of the reference frame specifying the temporally co-located MVP may not prevent parsing of the bitstream, as is common in conventional systems, while still maintaining the coding efficiency gains enabled by employing the pruning process.

In some instances, the techniques may be applied in other contexts. For example, a fourth version of HEVC Test Model (HM 4.0) proposes pruning MVPs and then adding additional MVPs if the total number of MVPs remaining after pruning is less than five. In other words, HM 4.0 would prune the five MVPs (i.e., one temporal and four spatial) to produce a pruned list of MVPs. If the number of MVPs in this pruned list of MVPs is less than five, HM 4.0 adds non-redundant MVPs until the total number of MVPs in the pruned list equals five. These non-redundant MVPs may be selected from other spatial or temporal blocks or may be generated based on MVPs in the pruned list of MVPs (e.g., selecting a y component of one MVP in the pruned list of MVPs and an x component from another different MVP in the pruned list of MVPs). In this context, the video encoder may implement the techniques described in this disclosure to select the additional non-redundant MVPs such that only spatial MVPs are selected and/or used to generate these additional non-redundant MVPs.

By only selecting spatial MVPS or using existing spatial MVPs remaining after pruning to generate these additional non-redundant MVPs, the video encoder may ensure that the video decoder can properly determine the selected one of the MVPs. That is, by always having five MVPs, the video encoder ensures that the video decoder may always parse the MVP index from the bitstream, but should a temporal MVP be lost, the video decoder may not be able to accurately construct the MVP list because the MVP cannot determine the order of the MVPs with respect to one another when a temporal MVP is lost. The techniques described in this disclosure may reduce or potentially eliminate the impact from losing temporal MVPs by not selecting any temporal MVPs or spatial MVPs that were themselves predicted from temporal MVPs as the additional non-redundant MVPs.

The techniques for specifying motion vector predictions described with respect to the examples of this disclosure may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission for applications such as video streaming, video playback, video broadcasting, and/or video telephony.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Figure 2:
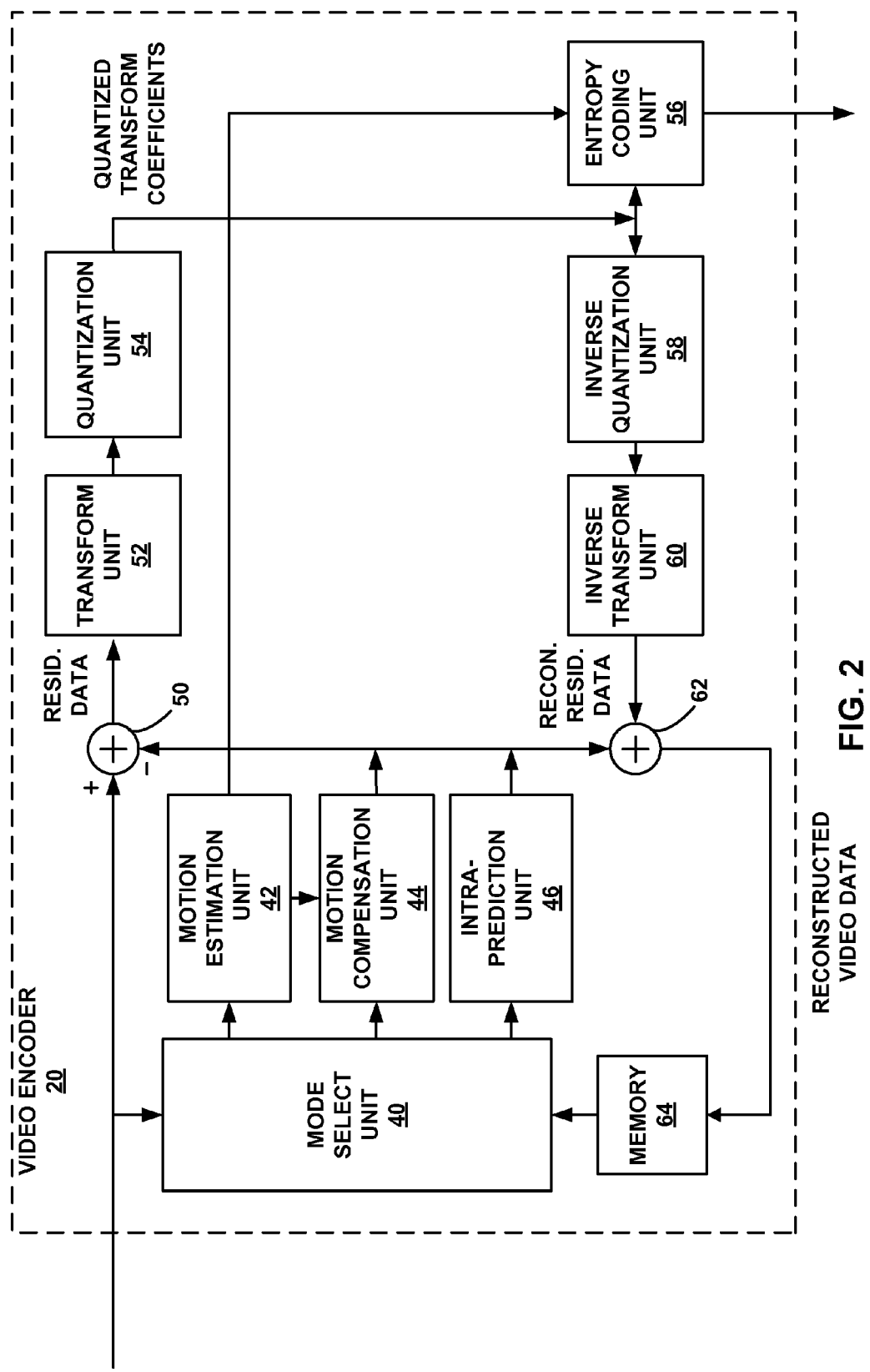
FIG. 2 is a block diagram illustrating an example of a video encoder that may implement the techniques described in this disclosure for specifying motion vector predictors.

FIG. 2 is a block diagram illustrating an example of video encoder 20 that may implement techniques for specifying motion vector predictors. Video encoder 20 may perform intra- and inter-coding of blocks within video frames, including macroblocks, or partitions or sub-partitions of macroblocks. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes. Although components for inter-mode encoding are depicted in FIG. 2, it should be understood that video encoder 20 may further include components for intra-mode encoding. However, such components are not illustrated for the sake of brevity and clarity.

As shown in FIG. 2, video encoder 20 receives a current video block within a video frame to be encoded. In the example of FIG. 2, video encoder 20 includes motion compensation unit 44, motion estimation unit 42, memory 64, summer 50, transform unit 52, quantization unit 54, and entropy coding unit 56. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. While described as including memory 64, which generally refers to random access memory (RAM), dynamic RAM (DRAM), static RAM (SRAM), Flash memory or other persistent or non-persistent chip-based storage medium, any type of non-transitory computer-readable medium may be utilized, including hard-drives, optical drives, disk drives, and the like.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra prediction unit 46 may also perform intra-predictive coding of the received video block relative to one or more neighboring blocks in the same frame or slice as the block to be coded to provide spatial compression.

As further shown in the example of FIG. 2, video encoder 20 also includes a mode select unit 40. Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in memory 64. Motion compensation unit 44 may also interpolate sub-integer pixels of the reference frame, e.g., an I-frame or a P-frame. The emerging HEVC standard (and the ITU H.264 standard) stores reference frames by way of one or more list data structures, which are commonly referred to as "lists." Therefore, data stored in memory 64 may also be considered lists. Motion estimation unit 42 compares blocks of one or more reference frames (or lists) from memory 64 to a block to be encoded of a current frame, e.g., a P-frame or a B-frame. When the reference frames in memory 64 include values for sub-integer pixels, a motion vector calculated by motion estimation unit 42 may refer to a sub-integer pixel location of a reference frame. Motion estimation unit 42 sends the calculated motion vector to entropy coding unit 56 and motion compensation unit 44. The reference frame block (which may comprise a CU) identified by a motion vector may be referred to as a predictive block. Motion compensation unit 44 calculates error values for the predictive block of the reference frame.

Motion compensation unit 44 may calculate prediction data based on the predictive block. Video encoder 20 forms a residual video block by subtracting the prediction data from motion compensation unit 44 from the original video block being coded. Summer 50 represents the component or components that perform this subtraction operation. Transform unit 52 applies a transform, such as a discrete cosine transform (DCT) or a conceptually similar transform, to the residual block, producing a video block comprising residual transform coefficient values. Transform unit 52 may perform other transforms, such as those defined by the H.264 standard, which are conceptually similar to DCT. Wavelet transforms, integer transforms, sub-band transforms or other types of transforms could also be used. In any case, transform unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring macroblocks.

In some cases, entropy coding unit 56 or another unit of video encoder 20 may be configured to perform other coding functions, in addition to entropy coding. For example, entropy coding unit 56 may be configured to determine the CBP values for the macroblocks and partitions. Also, in some cases, entropy coding unit 56 may perform run length coding of the coefficients in a macroblock or partition thereof. In particular, entropy coding unit 56 may apply a zig-zag scan or other scan pattern to scan the transform coefficients in a macroblock or partition and encode runs of zeros for further compression. Entropy coding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of a reference frame store in memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in the reference frame store of memory 64. The reconstructed video block may be used by motion estimation unit 42 and motion compensation unit 44 as a reference block to inter-code a block in a subsequent video frame.

As noted above, motion estimation unit 42 may, in some instances, not calculate a motion vector but instead determine a list of motion vector predictors, four of which are spatial candidate motion vectors and one of which is a temporal candidate motion vector. Typically, motion estimation unit 42 forgoes motion vector calculation in order to reduce the computation complexity of motion estimation and thereby improve the speed with which video data may be encoded while also reducing power consumption. In accordance with the techniques described in this disclosure, motion estimation unit 42 may determine an intermediate list of four spatial candidate motion vectors (or less upon determining that one or more of the spatial candidate motion vectors are themselves temporally predicted, where such temporally predicted spatial candidate motion vectors are removed from the pruning process), prune this list of (potentially only spatially predicted) spatial candidate motion vectors and add the temporal candidate motion vector (and potentially temporally predicted spatial candidate motion vectors) to the pruned list of (potentially only spatially predicted) spatial candidate motion vectors. Alternatively, motion estimation unit 42 may determine an intermediate list of four (when replacing these temporally predicted spatial candidate motion vectors with default candidate motion vectors) spatial candidate motion vectors, prune this list of spatial candidate motion vectors (including one or more of the determine default candidate motion vectors) and add the temporal candidate motion vector to the pruned list of spatial candidate motion vectors. Motion estimation unit 42 may output this list that includes the temporal motion vector candidate and the pruned spatial motion vector candidate to motion compensation unit 44.

Motion compensation unit 44 may then identify a reference frame block (which, again, may be referred to as prediction block) for each candidate motion vectors included in the list. Motion compensation unit 44 may then calculate prediction data based on the predictive block determined for each of the candidate motion vectors. Video encoder 20 may then determine residual data for each prediction data computed for a corresponding one of the candidate motion vectors, transform the residual data, quantize the transcoded residual data and then entropy encode the quantized residual data in the manner described above. Video encoder 20 may then perform inverse operations to decode this entropy encoded residual data generated with respect to teach of the candidate motion vectors remaining after pruning to reproduce reference data in the form of reconstructed video blocks. Mode select unit 40 may analyze each of the reconstructed video blocks generated with respect to each of the candidate motion vectors to select one of the candidate motion vectors. Mode select unit 40 may select the one of candidate motion vectors that provides the best rate-to-distortion ratio through a process commonly referred to as "rate-distortion optimization," which is typically abbreviated as "RDO."

RDO generally involves comparing a reconstructed frame, slice or block compressed to achieve a certain rate (which generally refers to a bitrate at which the compressed video data that includes the compressed frame, slice or block can be sent) with the original frame, slice or block and determining an amount of distortion between the original frame, slice or block and the reconstructed frame, slice or block at the given rate. Mode select unit 40 may encode the same video data using multiple different metrics that achieve or attempt to achieve a given rate, performing the distortion optimization process with respect to these various metrics. In this instance, mode select unit 40 may compare the RD output of each reconstructed video block and select the one that provides the least distortion at the target rate.

Mode select unit 40 may then indicate this selection to motion estimation unit 42, which proceeds to interface with entropy coding unit 56 to inform entropy coding unit 56 of the selection. Typically, motion estimation unit 42 interfaces with entropy coding unit 56 to indicate that motion vector prediction was performed along with the index identifying the selected candidate motion vector. As noted above, motion estimation unit 42 may arrange candidate motion vectors in a defined manner, such as by highest amplitude to lowest amplitude or lowest amplitude to highest amplitude or in any other defined way. Alternatively, motion estimation unit 42 may also signal to entropy coding unit 56 a way by which the candidate motion vectors were arranged in this list, which may also be referred to as an MVP list. Entropy coding unit 56 may then encode this index using either a unary or a truncated unary code along with any other information that may be necessary to indicate that MVP was performed to encode motion data. Entropy coding unit 56 may output the encoded index as a syntax element (which may be denoted as "mvp_idx") in a bitstream, which may be stored or transmitted in the manner described above with respect to the example of FIG. 1.

In some instances, entropy coding unit 56 performs a form of entropy coding referred to as context adaptive binary arithmetic coding (CABAC). In performing CABAC, entropy coding unit 56 may select one of a plurality of so-called contexts (which are different code tables specified for different context so as to more efficiently compress video data associated with the corresponding context) and encodes the compressed residual data according to the code table defined for the selected context. Entropy coding unit 56 may select one of the contexts based on context information, which may include the reference index determined when performing motion vector prediction, the number of unique motion vector candidates and the prediction direction determined when performing motion vector prediction.

Figure 3:
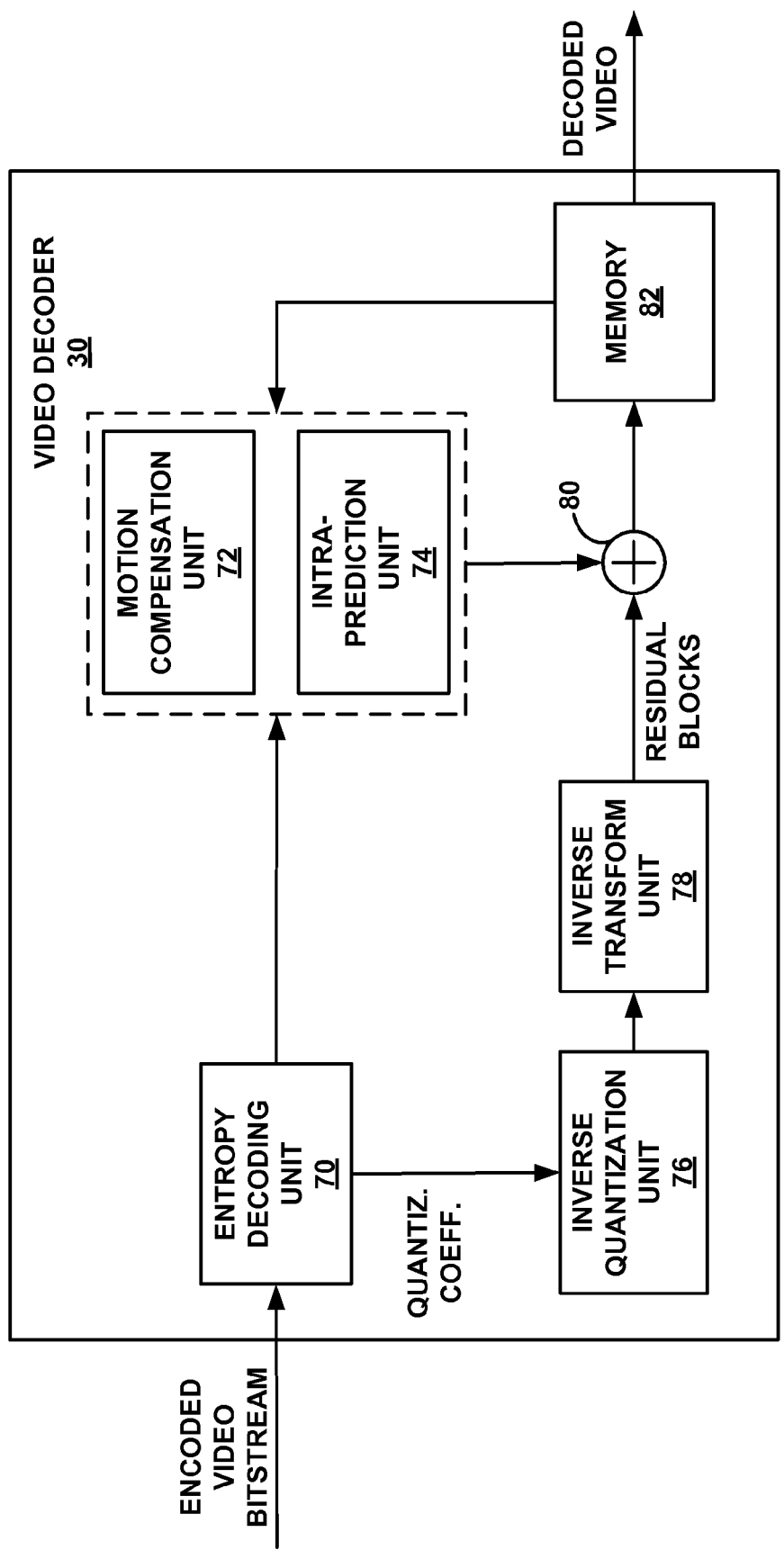
FIG. 3 is a block diagram illustrating an example of a video decoder that implements the motion vector prediction techniques described in this disclosure.

FIG. 3 is a block diagram illustrating an example of video decoder 30, which decodes an encoded video sequence. In the example of FIG. 3, video decoder 30 includes an entropy decoding unit 70, motion compensation unit 72, intra prediction unit 74, inverse quantization unit 76, inverse transformation unit 78, memory 82 and summer 80. Video decoder 30 may, in some examples, perform a decoding pass generally reciprocal to the encoding pass described with respect to a video encoder, such as video encoder 20 shown in the examples of FIGS. 1 and 2. Although generally reciprocal, video decoder 30 may, in some instances, perform techniques similar to those performed by video encoder 20. In other words, video decoder 30 may perform substantially similar processes to those performed by video encoder 20. Moreover, as described above, video encoder 20 may perform video decoding in the process of performing video encoding. To illustrate, inverse quantization unit 58, inverse transform unit 60, and summer 62 of video encoder 20 may perform operations substantially similar to inverse quantization unit 76, inverse transform unit 78 and summer 80 of video decoder 30.

As shown in the example of FIG. 3, entropy decoding unit 70 receives an encoded bitstream, which for purposes of illustration is assumed to include a unary or truncated unary coded index identifying a selected candidate motion vector (where, again, these candidate motion vectors may be referred to as motion vector predictors or MVPs). Entropy decoding unit 70 may, in performing a process generally reciprocal to entropy coding unit 56 of video encoder 20, receive a syntax element or other coding data for the current PU indicating that motion vector prediction was performed to determine a motion vector for the current PU. In response to this syntax element or other coding data, entropy decoding unit 70 determines implements the techniques described in this disclosure to determine the number of candidate motion vectors remain after pruning so as to properly parse the unary or truncated unary code from the bitstream.

To determine the number of candidate motion vectors, entropy coding unit 70 may interface with motion compensation unit 72, instructing motion compensation unit 72 to determine the number of candidate motion vectors in accordance with the techniques described in this disclosure. Motion compensation unit 72 retrieves spatial candidate motion vectors for PUs adjacent to the current PU and a temporal candidate motion vector for a co-located PU in the reference frame. Entropy coding unit 70 may provide motion compensation unit 72 with the reference frame identified for the current PU (typically as another syntax element in the bitstream). Alternatively, motion compensation unit 72 may be configured with regard to either the AMVP or merge mode to retrieve the temporal candidate motion vector from a reference frame identified in a set manner (e.g., such as one, two or any other number back or forward from the current frame in which the current PU is located).

Motion compensation unit 72 may then construct the intermediate list that includes the four spatial candidate motion vectors (or less upon determining that one or more of the spatial candidate motion vectors are themselves temporally predicted, where such temporally predicted spatial candidate motion vectors are removed from the pruning process), prune this list of (potentially only spatially predicted) spatial candidate motion vectors and combine the temporal candidate motion vector (and potentially temporally predicted spatial candidate motion vectors) with this pruned list of (potentially only spatially predicted) spatial candidate motion vectors in a manner substantially similar to that described above with respect to motion compensation unit 44 of video encoder 20. Alternatively, motion compensation unit 72 may determine an intermediate list of four spatial candidate motion vectors (replacing temporally predicted spatial candidate motion vectors with default candidate motion vectors), prune this list of spatial candidate motion vectors (including one or more of the determine default candidate motion vectors) and combine the temporal candidate motion vector with the pruned list of spatial candidate motion vectors in a manner again substantially similar to that described above with respect to motion compensation unit 44 of video encoder 20. In each case, motion compensation unit 72 outputs this list of candidate motion vectors determined after performing pruning as a pruned MVP list. After generating this pruned MVP list, motion compensation unit 72 counts the number of candidate motion vectors in this list and signals this number to entropy coding unit 70. Entropy coding unit 70 may then properly parse the unary or truncated unary coded index from the provided bitstream for the reasons described above. [good]

After parsing the unary or truncated unary coded index, entropy coding unit 70 may then decode the unary or truncated unary coded index to generate an index into the MVP list. Entropy coding unit 70 then passes this index to motion compensation unit 72, which then selects the one of the candidate motion vectors from the pruned MVP list identified by the index. For an inter-coded block, motion compensation unit 72 may then generate inter-prediction data based on the identified motion vector. Motion compensation unit 72 may use this motion vector to identify a prediction block in reference frames stored to memory 82. For intra-coded blocks, intra prediction unit 74 may use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter $QP_Y$ calculated by summer 50 for each macroblock to determine a degree of quantization and, likewise, a degree of inverse quantization that should be applied.

Inverse transform unit 60 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of CUs used to encode frame(s) of the encoded video sequence, partition information that describes how each CU of a frame of the encoded video sequence is partitioned, modes indicating how each CU is encoded, one or more reference frames (or lists) for each inter-encoded CU, and other information to decode the encoded video sequence.

Summer 80 sums the residual blocks with the corresponding prediction blocks generated by motion compensation unit 72 or intra-prediction unit to form decoded blocks. If desired, a deblocking filter may also be applied to filter the decoded blocks in order to remove blockiness artifacts. The decoded video blocks are then stored in a reference frame store in memory 82, which may be referred to as a decoded picture buffer in the HEVC standard, which provides reference blocks for subsequent motion compensation and also produces decoded video for presentation on a display device (such as display device 32 of FIG. 1).

In some instances, the temporal candidate motion vector may not be available, such as when a slice that specifies the temporal candidate motion vector is lost, i.e., not recovered or received in the encoded bitstream as one example. When this temporal candidate motion vector is unavailable, motion compensation unit 72 may set this temporal candidate motion vector to a default value or otherwise determine default motion vector information for this temporal candidate motion vector. In some instances, this default motion vector information for the temporal candidate motion vector may be reconstructed depending on whether the reference frame was intra-coded. When the reference frame is determined to be intra-coded, motion compensation unit 72 may derive the default motion vector information for a default candidate motion vector based on spatial motion vectors determined for the portion of the reference frame co-located in the same location of the reference frame as the current portion is in the current frame. Likewise, one or more of the temporally predicted spatial candidate motion vectors may be unavailable or lost and may derive the default motion vector information for a default candidate motion vector based on spatial motion vectors determined for the portion of the reference frame co-located in the same location of the reference frame as the current portion is in the current frame.

Various aspects of the techniques set forth in this disclosure may also address the issues that occur when performing CABAC or any other context-dependent lossless statistical coding process as a result of spatial candidate motion vectors that themselves were predicted from lost or missing temporal motion vectors. Entropy coding unit 70 may, in accordance with these aspects of the techniques, overcome this issue by disabling the lost spatial candidate motion vector. Alternatively, entropy coding unit 70 may replace this lost spatial candidate motion vector with default motion information. Entropy coding unit 70 may interface with motion compensation unit 72 to determine this default motion information. This default motion information may specify a default motion vector, prediction direction and reference index. In some instances, motion compensation unit 72 generates this replacement motion information based on a slice type (that indicates whether the current slice is intra- or inter-predicted, etc.), a current CU depth (as in a depth of the CU in the above noted quadtree hierarchy in which the current PU resides), a current PU size or any other available information. Motion compensation unit 72 may then provide this default motion information to entropy coding unit 70. By utilizing this default motion information, entropy coding unit 70 may still perform the CABAC process.

The techniques described in this disclosure, in some examples, may also overcome issues that arise when motion compensation unit 72 is unable to determine whether a spatial candidate motion vector was itself predicted from a spatial candidate motion vector or a temporal candidate motion vector (such as when its temporal candidate motion vector was lost). In these instances when one of the spatial candidate motion vectors is unavailable, motion compensation unit 72 may implement the techniques of this disclosure to disable spatial motion vector prediction (and thereby utilize the co-located temporal candidate motion vector regardless of what was signaled by the encoder). Alternatively, motion compensation unit 72 may determine default motion information in the manner described above.

The techniques may further overcome issues that occur when motion compensation unit 72 is unable to determine whether a spatial candidate motion vector was itself predicted from a temporal candidate motion vector (such as when its temporal candidate motion vector was lost). In these instances, when one of the spatial candidate motion vectors is unavailable, motion compensation unit 72 may implement the techniques of this disclosure to disable spatial motion vector prediction (and thereby utilize the co-located temporal candidate motion vector regardless of what was signaled by the encoder). Alternatively, motion compensation unit 72 may determine default motion information in the manner described above, either performing pruning with respect to this default motion information of the default candidate motion vector or removing this default candidate motion vector from pruning entirely (but specifying it separately to enable parsing of the bitstream.

As noted above, there are two types of motion vector prediction: merge mode and AMVP. For merge mode, motion compensation unit 72 determines the motion vector amplitude, prediction direction and reference index when determining the default motion information. For AMVP, motion compensation unit 72 determines a motion vector amplitude but need not determine the prediction direction and reference index as these are signaled separately in the bitstream for the current PU. Thus, motion compensation unit 72 may base the determination of the default motion information based on the mode signaled for performing motion vector prediction, i.e., whether the type of motion vector prediction signaled is merge mode or AMVP for the current PU.

Figure 4:
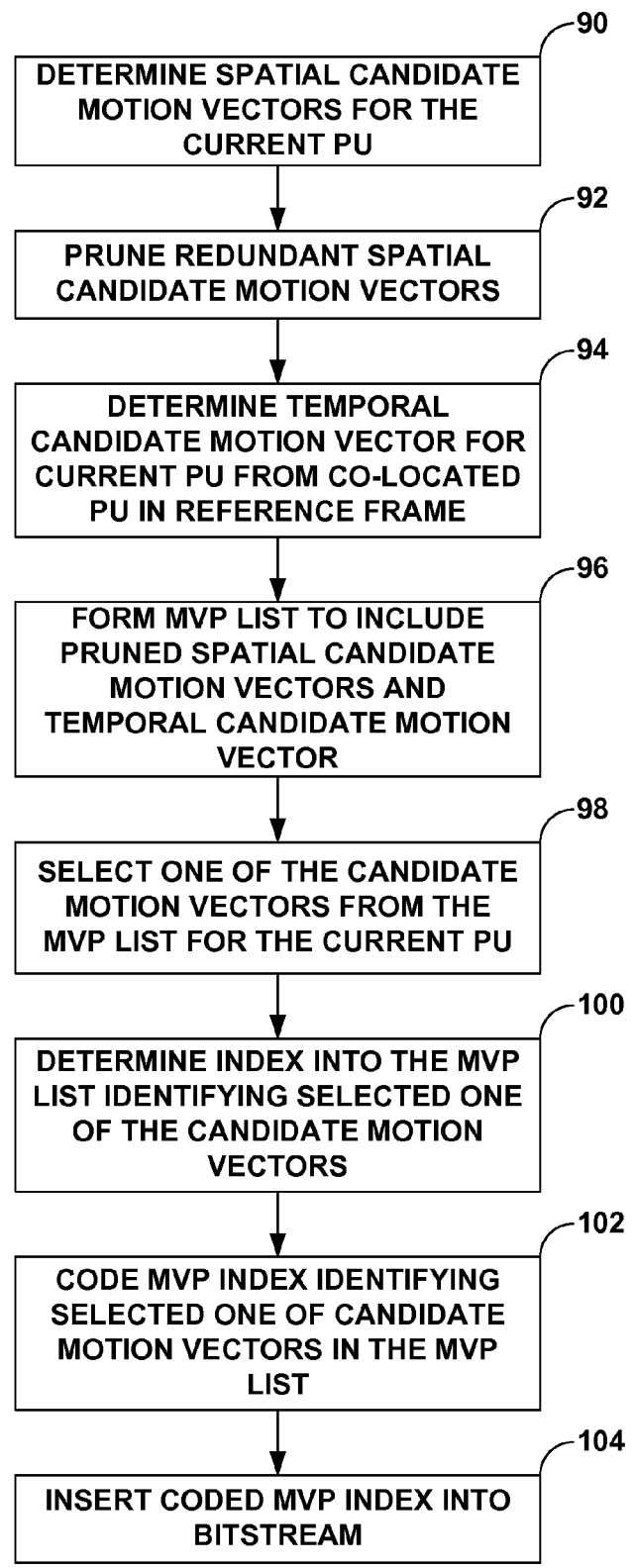
FIG. 4 is a flowchart illustrating exemplary operation of a video encoder in performing the motion vector prediction techniques described in this disclosure.

FIG. 4 is a flowchart illustrating exemplary operation of a video encoder, such as video encoder 20 shown in the example of FIG. 2, in performing the motion vector prediction techniques described in this disclosure. Initially, motion estimation unit 42 may, as described above, determine spatial candidate motion vectors for a current PU corresponding to a current CU (90). Motion estimation unit 42 may instantiate what may be referred to as an intermediate list or intermediate spatial MVP list that stores these spatial candidate motion vectors. Motion estimation unit 42 may then prune redundant spatial candidate motion vectors in one of the ways described above (92). In this sense, motion estimation unit 42 may generate an intermediate spatial MVP list of remaining spatial candidate motion vectors.

After generating this intermediate spatial MVP list of remaining spatial candidate motion vectors, motion estimation unit 42 may determine a temporal candidate motion vector for the current PU from a co-located PU in a reference frame, again, as described above (94). Next, motion estimation unit 42 may form an MVP list to include the remaining spatial candidate motion vectors and the temporal candidate motion vector (96). Motion estimation unit 42 may provide this MVP list to motion compensation unit 44, which performs motion compensation in the manner described above with respect to each candidate motion vectors included in the MVP list. Video encoder 20 then generates residual data based on the prediction data generated by way of motion compensation performed with respect to each of the candidate motion vectors included in the MVP list. Video encoder 20 applies one or more transforms to the residual data, quantizes the transformed residual data and then reconstructs the residual data. The reconstructed residual data is then augmented by predication data generated based on each of the candidate motion vectors included in the MVP list to generate reconstructed video data.

Mode select unit 40 may then select one of the candidate motion vectors from the MVP list for the current PU based on the reconstructed video data (98). For example, mode select unit 40 may perform some form of rate-distortion analysis on the reconstructed video data reconstructed with respect to each of the candidate motion vectors in the MVP list and select the one of the candidate motion vectors from the list that provides the best rate-to-distortion metric. Mode select unit 40 may then interface with motion estimation unit 42 to indicate its candidate motion vector selection. Motion estimation unit 42 may then determine an index into the MVP list identifying the selected one of the candidate motion vectors, as described above (100). Motion estimation unit 42 may then provide this index to entropy coding unit 56. Entropy coding unit 56 may then code the index identifying the selected on of the candidate motion vectors in the MVP list, as further described above (102). Entropy coding unit 56 then inserts the coded index into the bitstream (104).

Figure 5:
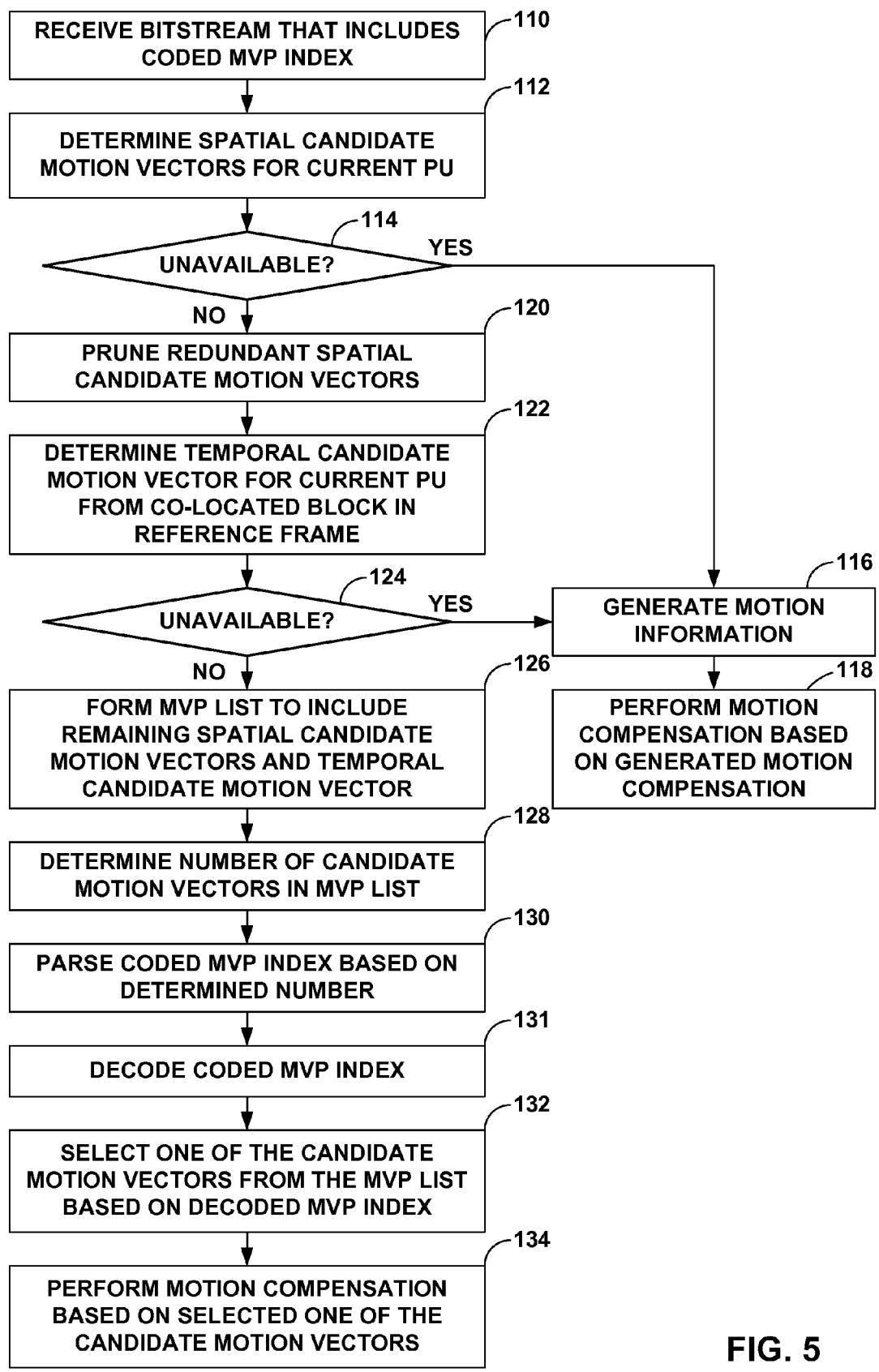
FIG. 5 is a flowchart illustrating exemplary operation of a video decoder in implementing the motion vector prediction techniques described in this disclosure.

FIG. 5 is a flowchart illustrating exemplary operation of a video decoder, such as video decoder 30 shown in the example of FIG. 3, in implementing the motion vector prediction techniques described in this disclosure. As described above, entropy decoding unit 70 of video decoder 30 initially receives a bitstream that includes a coded index, which is commonly referred to by its syntax element name of "mvp_idx" or "MVP index" (110). Entropy decoding unit 70 also decodes other syntax elements either before or after this MVP index indicating that the current PU has motion vectors expressed as motion vector predictions. To parse this MVP index from the bitstream, entropy decoding unit 70 first must determine the number of candidate motion vectors remain after performing the pruning process. To determine the number of candidate motion vectors, entropy decoding unit 70 interfaces with motion compensation unit 72, requesting that motion compensation unit 72 provide this number of candidate motion vectors for the current PU.

In response to this request, motion compensation unit 72 determines spatial candidate motion vectors for the current PU in the manner described above (112). If one or more of the spatial candidate motion vectors are unavailable for reasons set forth in more detail above ("YES" 114), motion compensation unit 72 may generate motion information (such as default motion information) in any of the ways described above and perform motion compensation based on the generated motion information (116, 118). If all of the spatial candidate motion vectors are available ("NO" 114), motion compensation unit 72 prunes redundant spatial candidate motion vectors as further described above (120).

After pruning the redundant spatial candidate motion vectors, motion compensation unit 72 then determines a temporal candidate motion vector for the current PU from a co-located PU in a reference frame as described above (122). If this temporal candidate motion vector is unavailable for the reasons described above ("YES" 124), motion compensation unit 72 generates motion information and performs motion compensation based on the generated motion information (116, 118). However, if the temporal candidate motion vector is available ("NO" 124), motion compensation unit 72 forms an MVP list to include the remaining spatial candidate motion vectors and the temporal candidate motion vector (126). Motion compensation unit 72 may then determine the number of candidate motion vectors in the MVP list (128), passing this number to entropy decoding unit 70.

Entropy decoding unit 70 may then parse the MVP index from the bitstream based on the determined number (130). Entropy decoding unit 70 then decodes the coded MVP index (131). Entropy decoding unit 70 passes the decoded MVP index to motion compensation unit 72, which selects one of the candidate motion vectors from the MVP list based on the decoded MVP index, as described above (132). Motion compensation unit 72 then performs motion compensation in the manner described above based on the selected on of the candidate motion vectors (134). Motion compensation unit 72 may perform motion compensation in accordance with either the merge mode or AMVP depending on which mode is either signaled in the bitstream or determined by motion compensation unit 72.

Figure 6:
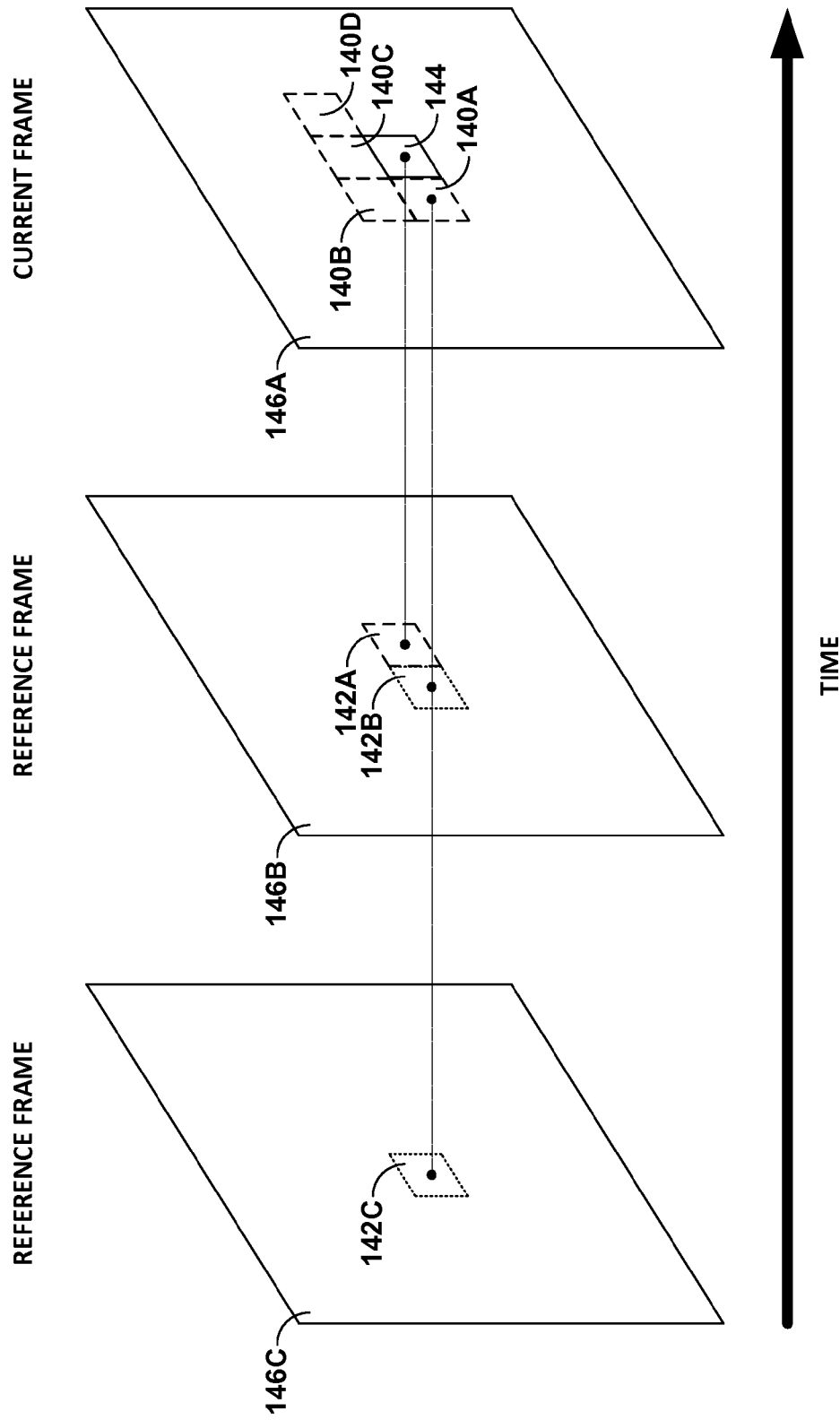
FIG. 6 is a diagram illustrating an exemplary arrangement of adjacent neighboring predictive units (PUs) and a temporal co-located PU for a current PU.

FIG. 6 is a diagram illustrating an exemplary arrangement of adjacent neighboring PUs 140A-140D and a temporal co-located PU 142A for a current PU 144. As shown in the example of FIG. 6, current PU 144 is included within a current frame 146A. Temporally, current frame 146A is preceded first by a reference frame 146B and then a reference frame 146C. Adjacent neighboring PU 140A resides spatially adjacent to the left of current PU 144. Adjacent neighboring PU 140B resides spatially adjacent to the top-left of current PU 144. Adjacent neighboring PU 140C resides spatially adjacent to the top of current PU 144. Adjacent neighboring PU 140D resides spatially adjacent to the top-right of current PU 144. Temporally co-located PU 142A temporally precedes current PU 144 and is located within reference frame 146B in the same location as current PU 144 is located within current frame 146A.

Each of adjacent neighboring PUs 140A-140D store or otherwise provides a spatial candidate motion vector for current PU 144, while temporally co-located PU 142A stores or otherwise provides a temporal candidate motion vector for current PU 144. Motion compensation units of video decoders, such as motion compensation unit 72 of video decoder 30 shown in the example of FIG. 2, may retrieve these spatial and temporal candidate motion vectors from PUs 140A-140D and 142A, respectively. Because temporally co-located PU 142A is included within a different reference frame 146B from that of current PU 144, this temporally co-located PU 142A is typically associated with a different independently decodable portion (which is often referred to a slice in the emerging HEVC standard). This slice of reference frame 146B may be lost (e.g., in transmission or due to corruption in memory or a storage device) and motion compensation unit 72 may not be able to retrieve this temporally co-located PU 142A storing the temporal candidate motion vector for current PU 144. Losing this temporal candidate motion vector may prevent entropy decoding unit 70 from parsing the bitstream for the reasons noted above. The techniques described in this disclosure may enable motion compensation unit 72 to overcome this issue by not including the temporal candidate motion vector in the pruning process.

Likewise, spatial candidate motion vectors for current PU 144 may be lost when MVP is performed to determine the motion vector for one of adjacent neighboring PUs 140A-140D with the result that the temporal candidate motion vector being selected and its temporally co-located PU storing the temporal candidate motion vector is lost. To illustrate, consider adjacent neighboring PU 140A whose temporally co-located PU is identified in the example of FIG. 6 as temporally co-located PU 142B. If PU 142B is lost and the motion vector for spatial neighbor PU 140A is selected as the temporal candidate motion vector associated with PU 142B, there is no motion vector information for PU 140A. As a result, the spatial candidate motion vector for current PU 144 is also lost. To potentially overcome this lost spatial candidate motion vector, the techniques enable motion compensation unit 72 to generate motion information (such as default motion information), which may be used as a spatial candidate motion vector for current PU 144.

Moreover, this lost spatial candidate motion vector (or, for that matter, lost temporal candidate motion vector) may arise when MVP is performed and the temporal candidate motion vector is selected for multiple temporally co-located PUs. To illustrate, assume that MVP is performed to determine a motion vector for PU 142B, which is temporally co-located with PU 140A, and its temporally co-located PU, i.e., PU 142C in the example of FIG. 6, is lost. This loss, absent the techniques described in this disclosure, would not only potentially prevent the MVP index from being parsed from the bitstream but also results in the loss of the motion vector for PU 142B. Loss of the motion vector for PU 142B, absent the techniques described in this disclosure, results in the loss of the motion vector for PU 140A, assuming MVP was performed to determine the motion vector for PU 140A and temporally co-located PU 142B was selected. Loss of this motion vector impacts current PU 144 in that a spatial candidate motion vector is unavailable. For this reason, the techniques enable motion compensation unit 72 to generate motion information (or, in some instances, regenerate the lost motion information) so as to prevent what may be referred to as multiple loss effect.

While the examples described above refer to removing duplicate spatial candidate motion vectors, the techniques may not necessarily require that only duplicate spatial candidate motion vectors be removed. The techniques may be implemented to perform pruning so as to generally remove at least one of the spatial candidate motion vectors. For example, the video encoder may signal at the picture, frame, slice or block level that the spatial candidate motion vector with, to name a few examples, the largest amplitude or the smallest amplitude is to be pruned. Alternatively, the video encoder may signal in the bitstream any criteria, such as a threshold, by which MVPs may be specified as criteria for pruning. In some embodiments, the video encoder and video decoder may agree to a certain profile or other configuration by which candidate motion vectors may be pruned. In some instances, the video decoder may imply when certain candidate motion vectors are to be pruned based on context or other information. The techniques, therefore, should not be strictly limited to performing pruning only to remove duplicate spatial candidate motion vectors but to encompass any techniques that may be implemented to prune at least one spatial candidate motion vector.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
   determining spatial candidate motion vectors associated with a current portion of a current video frame, wherein the spatial candidate motion vectors comprise motion vectors determined for neighboring portions of the current video frame adjacent to the current portion, and wherein determining the spatial candidate motion vector comprises pruning only the spatial candidate motion vectors to remove duplicate ones of the spatial candidate motion vectors;
   determining a temporal candidate motion vector associated with the current portion of the current video frame, wherein the temporal candidate motion vector comprises a motion vector determined for a portion of a reference video frame, wherein the determined temporal candidate motion vector is a duplicate of one of the spatial candidate motion vectors, and wherein the spatial candidate motion vectors and the determined temporal candidate motion vectors each comprises a vertical component and a horizontal component;

selecting the temporal candidate motion vector or one of the spatial candidate motion vectors remaining after pruning as a selected candidate motion vector for a motion vector prediction process; and signaling the selected candidate motion vector in a bitstream.

2. The method of claim 1,
wherein the current portion comprises a current coding unit (CU),
wherein the portion of the reference frame comprises a CU of the reference frame.

3. The method of claim 1, further comprising generating a predictive unit (PU) that includes prediction data comprising at least the selected candidate motion vector,
wherein signaling the selected candidate motion vector comprises signaling the PU in the bitstream.

4. The method of claim 1, wherein signaling the selected candidate motion vector comprises signaling the selected candidate motion vector as a motion vector predictor (MVP) index that identifies a location of the selected candidate motion vector in a list of the temporal candidate motion vector and the spatial candidate motion vectors that remain after pruning.

5. The method of claim 1, further comprising:
determining a motion vector predictor (MVP) index that identifies a location of the selected candidate motion vector in a list of the temporal candidate motion vector and the spatial candidate motion vectors that remain after pruning; and
encoding the MVP index using one of a unary code or a truncated unary code to generate an encoded MVP index,
wherein signaling the selected candidate motion vector comprises signaling the encoded MVP index in the bitstream.

6. The method of claim 1, wherein selecting the temporal candidate motion vector or one of the spatial candidate motion vectors remaining after pruning comprises:
performing a rate-distortion analysis with respect to each of the temporal candidate motion vector and the spatial candidate motion vectors remaining after pruning; and
selecting the temporal candidate motion vector or one of the spatial candidate motion vectors remaining after pruning as the selected candidate motion vector based on the rate-distortion analysis.

7. The method of claim 1, further comprising determining whether each of the determined spatial candidate motion vectors were spatially predicted or temporally predicted,
wherein pruning the spatial candidate motion vectors to remove the duplicate ones of the spatial candidate motion vectors comprises pruning only those of the determined spatial candidate motion vectors that were determined to be spatially predicted without pruning any of those of the determined spatial candidate motion vectors that were determined to be temporally predicted, and
wherein selecting the temporal candidate motion vector or one of the spatial candidate motion vectors remaining after pruning as the selected candidate motion vector comprises selecting the temporal candidate motion vector, one of the spatial candidate motion vectors that was determined to be temporally predicted or one of the spatial candidate motion vectors determined to be spatially predicted remaining after pruning as the selected candidate motion vector.

8. The method of claim 1, further comprising:
determining whether each of the determined spatial candidate motion vectors were spatially predicted or temporally predicted; and
replacing any of the spatial candidate motion vectors that were determined to be temporally predicted with a default candidate motion vector, wherein the default candidate motion vector includes default motion vector information, wherein the default motion vector information comprises a motion vector amplitude, a prediction direction identifying whether the reference frame precedes or follows the current frame temporally, and a reference index identifying the reference frame, and
wherein pruning the spatial candidate motion vectors to remove the duplicate ones of the spatial candidate motion vectors comprises pruning the spatial candidate motion vectors that include one or more of the default candidate motion vectors to remove duplicate ones of the spatial candidate motion vectors.

9. The method of claim 1, further comprising determining one or more additional spatial candidate motion vectors that are not temporally predicted and that are different from any of the temporal candidate motion vector and the spatial candidate motion vectors remaining after pruning,
wherein selecting the temporal candidate motion vector or one of the spatial candidate motion vectors remaining after pruning comprises selecting the temporal candidate motion vector, one of the spatial candidate motion vectors remaining after pruning or one of the additional spatial candidate motion vectors as the selected candidate motion vector.

10. The method of claim 1, further comprising determining one or more additional spatial candidate motion vectors that are not temporally predicted and that are different from any of the temporal candidate motion vector and the spatial candidate motion vectors remaining after pruning,
wherein selecting the temporal candidate motion vector or one of the spatial candidate motion vectors remaining after pruning comprises selecting the temporal candidate motion vector, one of the spatial candidate motion vectors remaining after pruning or one of the additional spatial candidate motion vectors as the selected candidate motion vector.

11. An apparatus for encoding video data, the apparatus comprising:
means for determining spatial candidate motion vectors associated with current portion of a current video frame, wherein the spatial candidate motion vectors comprise motion vectors determined for neighboring portions for the current video frame adjacent to the current portion, wherein the means for determining the spatial candidate motion vector comprises means for pruning only the spatial candidate motion vectors to remove duplicate ones of the spatial candidate motion vectors;
means for determining a temporal candidate motion vector associated with the current portion of the current video frame, wherein the temporal candidate motion vector comprises a motion vector determined for a portion of a reference video frame, wherein the determined temporal candidate motion vector is a duplicate of one of the spatial candidate motion vectors, and wherein the spatial candidate motion vectors and the determined temporal candidate motion vectors each comprises a vertical component and a horizontal component;

means for selecting the temporal candidate motion vector or one of the spatial candidate motion vectors remaining after pruning as a selected candidate motion vector for a motion vector prediction process; and means for signaling the selected candidate motion vector in a bitstream.

12. The apparatus of claim 11, further comprising means for determining whether each of the determined spatial candidate motion vectors were spatially predicted or temporally predicted, wherein the means for pruning the spatial candidate motion vectors to remove the duplicate ones of the spatial candidate motion vectors comprises means for pruning only those of the determined spatial candidate motion vectors that were determined to be spatially predicted without pruning any of those of the determined spatial candidate motion vectors that were determined to be temporally predicted, and wherein the means for selecting the temporal candidate motion vector or one of the spatial candidate motion vectors remaining after pruning as the selected candidate motion vector comprises means for selecting the temporal candidate motion vector, one of the spatial candidate motion vectors that was determined to be temporally predicted or one of the spatial candidate motion vectors determined to be spatially predicted remaining after pruning as the selected candidate motion vector.

13. The apparatus of claim 11, further comprising:

means for determining whether each of the determined spatial candidate motion vectors were spatially predicted or temporally predicted; and means for replacing any of the spatial candidate motion vectors that were determined to be temporally predicted with a default candidate motion vector, wherein the default candidate motion vector includes default motion vector information, wherein the default motion vector information comprises a motion vector amplitude, a prediction direction identifying whether the reference frame precedes or follows the current frame temporally, and a reference index identifying the reference frame, and wherein the means for pruning the spatial candidate motion vectors to remove the duplicate ones of the spatial candidate motion vectors comprises means for pruning the spatial candidate motion vectors that include one or more of the default candidate motion vectors to remove the duplicate ones of the spatial candidate motion vectors.

14. The apparatus of claim 11, further comprising means for determining one or more additional spatial candidate motion vectors that are not temporally predicted and that are different from any of the temporal candidate motion vector and the spatial candidate motion vectors remaining after pruning, wherein the means for selecting the temporal candidate motion vector or one of the spatial candidate motion vectors remaining after pruning comprises means for selecting the temporal candidate motion vector, one of the spatial candidate motion vectors remaining after pruning or one of the additional spatial candidate motion vectors as the selected candidate motion vector.

15. An apparatus for encoding video data, the apparatus comprising:

a memory configured to store the video data comprising a current portion of a current video frame; and one or more processors comprising a video encoder configured to:

determine spatial candidate motion vectors associated with the current portion of the current video frame by, at least in part, pruning only the spatial candidate motion vectors to remove duplicate ones of the spatial candidate motion vectors without considering the temporal candidate motion vector during the pruning process, wherein the spatial candidate motion vectors comprise motion vectors determined for neighboring portions for the current video frame adjacent to the current portion, determines a temporal candidate motion vector associated with the current portion of the current video frame, wherein the temporal candidate motion vector comprises a motion vector determined for a portion of a reference video frame, and wherein the determined temporal candidate motion vector is a duplicate of one of the spatial candidate motion vectors, and wherein the spatial candidate motion vectors and the determined temporal candidate motion vectors each comprises a vertical component and a horizontal component, and selects the temporal candidate motion vector or one of the spatial candidate motion vectors remaining after pruning as a selected candidate motion vector for a motion vector prediction process, and signals the selected candidate motion vector in a video bitstream.

16. The apparatus of claim 15, wherein the current portion comprises a current coding unit (CU), wherein the portion of the reference frame comprises a CU of the reference frame.

17. The apparatus of claim 15, wherein the motion compensation unit further generates a predictive unit (PU) that includes prediction data comprising at least the selected candidate motion vector, wherein the entropy coding unit signals the PU in the bitstream.

18. The apparatus of claim 15, wherein the video encoder signals the selected candidate motion vector as a motion vector predictor (MVP) index that identifies a location of the selected candidate motion vector in a list of the temporal candidate motion vector and the spatial candidate motion vectors that remain after pruning.

19. The apparatus of claim 15, wherein the video encoder determines a motion vector predictor (MVP) index that identifies a location of the selected candidate motion vector in a list of the temporal candidate motion vector and the spatial candidate motion vectors that remain after pruning, and wherein the entropy coding unit encodes the MVP index using one of a unary code or a truncated unary code to generate an encoded MVP index and signals the encoded MVP index in the bitstream.

20. The apparatus of claim 15, wherein the video encoder is further configured to perform a rate-distortion analysis with respect to each of the temporal candidate motion vector and the spatial candidate motion vectors remaining after pruning and selects the temporal candidate motion vector or one of the spatial candidate motion vectors remaining after pruning as the selected candidate motion vector based on the rate-distortion analysis.

21. The apparatus of claim 15, wherein the video encoder is further configured to determine whether each of the determined spatial candidate motion vectors were spatially predicted or temporally predicted and prunes only those of the determined spatial candidate motion vectors that were determined to be spatially predicted without pruning any of those of the determined spatial candidate motion vectors that were determined to be temporally predicted, and wherein the video encoder is further configured to select the temporal candidate motion vector, one of the spatial candidate motion vectors that was determined to be temporally predicted or one of the spatial candidate motion vectors determined to be spatially predicted remaining after pruning as the selected candidate motion vector.

22. The apparatus of claim 15, wherein the video encoder is configured to determine whether each of the determined spatial candidate motion vectors were spatially predicted or temporally predicted, replaces any of the spatial candidate motion vectors that were determined to be temporally predicted with a default candidate motion vector, wherein the default candidate motion vector includes default motion vector information, wherein the default motion vector information comprises a motion vector amplitude, a prediction direction identifying whether the reference frame precedes or follows the current frame temporally, and a reference index identifying the reference frame, and prunes the spatial candidate motion vectors that include one or more of the default candidate motion vectors to remove the duplicate ones of the spatial candidate motion vectors.

23. The apparatus of claim 15, wherein the video encoder is further configured to determine one or more additional spatial candidate motion vectors that are not temporally predicted and that are different from any of the temporal candidate motion vector and the spatial candidate motion vectors remaining after pruning, wherein the video encoder is further configured to select the temporal candidate motion vector, one of the spatial candidate motion vectors remaining after pruning or one of the additional spatial candidate motion vectors as the selected candidate motion vector.

24. A non-transitory computer-readable medium comprising instructions that, when executed, cause one or more processors to:

determine spatial candidate motion vectors associated with current portion of a current video frame by, at least in part, pruning only the spatial candidate motion vectors to remove duplicate ones of the spatial candidate motion vectors without considering the temporal candidate motion vector during the pruning process, wherein the spatial candidate motion vectors comprise motion vectors determined for neighboring portions of the current video frame adjacent to the current portion;

determine a temporal candidate motion vector associated with the current portion of the current video frame, wherein the temporal candidate motion vector comprises a motion vector determined for a portion of a reference video frame, and wherein the determined temporal candidate motion vector is a duplicate of one of the spatial candidate motion vectors, and wherein the spatial candidate motion vectors and the determined temporal candidate motion vectors each comprises a vertical component and a horizontal component;

select the temporal candidate motion vector or one of the spatial candidate motion vectors remaining after pruning as a selected candidate motion vector for a motion vector prediction process; and signal the selected candidate motion vector in a bitstream.

25. A method of decoding video data, the method comprising:

determining spatial candidate motion vectors associated with a current portion of a current video frame, wherein the spatial candidate motion vectors comprise neighbor motion vectors determined for spatially neighboring portions adjacent to the current portion within the current video frame, and wherein determining the spatial candidate motion vector comprises pruning only the spatial candidate motion vectors to remove duplicate ones of the spatial candidate motion vectors;

selecting a temporal candidate motion vector or one of the spatial candidate motion vectors remaining after pruning as a selected candidate motion vector for a motion vector prediction process based on a motion vector predictor (MVP) index signaled in a bitstream, wherein the temporal candidate motion vector comprises a motion vector determined for a portion of a reference video frame, and wherein the temporal candidate motion vector is a duplicate of one of the spatial candidate motion vectors, and wherein the spatial candidate motion vectors and the determined temporal candidate motion vectors each comprises a vertical component and a horizontal component; and performing motion compensation based on the selected candidate motion vector to predict the current portion of the current video frame; and decoding the current portion of the current video frame based on the predicted current portion.

26. The method of claim 25, further comprising:

determining a number of candidate motion vectors as the temporal candidate motion vector plus the ones of the spatial candidate motion vectors remaining after pruning;

parsing a coded MVP index from the bitstream based on the determined number of candidate motion vectors, wherein the coded MVP index comprises one of a unary coded MVP index and a truncated unary coded MVP index; and decoding the coded MVP index to determine the MVP index.

27. The method of claim 25, further comprising:

determining that the temporal candidate motion vector for the current portion of the current frame is unavailable; and in response to determining that the temporal candidate motion vector is unavailable, obtaining statically configured default motion vector information for the temporal candidate motion vector.

28. The method of claim 25, further comprising:

determining that the temporal candidate motion vector for the current portion of the current frame is unavailable;

in response to determining that the temporal candidate motion vector is unavailable, determining default motion vector information for the temporal candidate motion vector, wherein the default motion vector information comprises a motion vector amplitude, a prediction direction identifying whether the reference frame precedes or follows the current frame temporally, and a reference index identifying the reference frame; and determining a context for performing a context adaptive lossless statistical decoding based on the determined default motion vector information, wherein the context identifies a coding table to use to decode the video data.

29. The method of claim 25, further comprising:

determining that the temporal candidate motion vector for the current portion of the current frame is unavailable;

determining whether the reference frame was intra-coded; and in response to determining that the temporal candidate motion vector is unavailable and when the reference frame is determined to be intra-coded, deriving default motion vector information for the temporal candidate motion vector based on spatial motion vectors determined for the portion of the reference frame.

30. The method of claim 25, further comprising:
determining that one of the spatial candidate motion vectors is unavailable; and
in response to determining that the one of the spatial candidate motion vectors is unavailable, determining a default candidate motion vector that includes default motion vector information for the one of the spatial candidate motion vectors based on a motion vector prediction mode, and
wherein pruning the spatial candidate motion vectors to remove the duplicate ones of the spatial candidate motion vectors comprises pruning the spatial candidate motion vectors that include one or more of the default candidate motion vectors to remove duplicate ones of the spatial candidate motion vectors, and
wherein selecting the temporal candidate emotion vector comprises selecting the temporal candidate motion vector, one of the spatial candidate motion vectors remaining after pruning as the selected candidate motion vector comprises selecting the temporal candidate motion vector or one of the spatial candidate motion vectors determined to be unavailable or one of the spatial candidate motion vectors remaining after pruning based on the motion vector predictor (MVP) index signaled in the bitstream.

31. The method of claim 30, wherein determining the default motion vector information comprises determining a motion vector amplitude without determining a prediction direction identifying whether the reference frame precedes or follows the current frame temporally or a reference index identifying the reference frame when the motion vector prediction mode is an adaptive motion vector prediction (AMVP) mode.

32. The method of claim 30, wherein determining the default motion vector information comprises determining a motion vector amplitude, a prediction direction identifying whether the reference frame precedes or follows the current frame temporally, and a reference index identifying the reference frame when the motion vector prediction mode is a merge mode.

33. The method of claim 30, further comprising determining a context for performing a context adaptive lossless statistical decoding based on the determined default motion vector information, wherein the context identifies a coding table to use to decode the video data.

34. The method of claim 25, further comprising:
determining that one of the spatial candidate motion vectors is unavailable; and
in response to determining that the one of the spatial candidate motion vectors is unavailable, removing the one of the spatial candidate motion vectors that is determined to be unavailable from the pruning process,
wherein pruning the spatial candidate motion vectors comprises pruning only those of the spatial candidate motion vectors that were determined to be available to remove the duplicate ones of the spatial candidate motion vectors without removing a temporal candidate motion vector determined for the current portion of the current video frame or the one of the spatial candidate motion vectors that is determined to be unavailable.

35. An apparatus for decoding video data, the apparatus comprising:
means for determining spatial candidate motion vectors associated with a current portion of a current video frame, wherein the spatial candidate motion vectors comprise motion vectors determined for neighboring portions of the current video frame adjacent to the current portion, wherein the means for determining the spatial candidate motion vector comprises means for pruning only the spatial candidate motion vectors to remove duplicate ones of the spatial candidate motion vectors;
means for selecting one of a temporal candidate motion vector or one of the spatial candidate motion vectors remaining after pruning as a selected candidate motion vector for a motion vector prediction process based on a motion vector predictor (MVP) index signaled in a bitstream, wherein the temporal candidate motion vector comprises a motion vector determined for a portion of a reference video frame, and wherein the temporal candidate motion vector is a duplicate of one of the spatial candidate motion vectors, and wherein the spatial candidate motion vectors and the determined temporal candidate motion vectors each comprises a vertical component and a horizontal component; and
means for performing motion compensation based on the selected candidate motion vector to predict the current portion of the current video frame; and
means for decoding the current portion of the current video frame based on the predicted current portion.

36. The apparatus of claim 35, further comprising:
means for determining a number of candidate motion vectors as the temporal candidate motion vector plus the ones of the spatial candidate motion vectors remaining after pruning;
means for parsing a coded MVP index from the bitstream based on the determined number of candidate motion vectors, wherein the coded MVP index comprises one of a unary coded MVP index and a truncated unary coded MVP index; and
means for decoding the coded MVP index to determine the MVP index.

37. The apparatus of claim 35, further comprising:
means for determining that the temporal candidate motion vector for the current portion of the current frame is unavailable; and
means for obtaining, in response to determining that the temporal candidate motion vector is unavailable, statically configured default motion vector information for the temporal candidate motion vector.

38. The apparatus of claim 35, further comprising:
means for determining that the temporal candidate motion vector for the current portion of the current frame is unavailable;
means for determining, in response to determining that the temporal candidate motion vector is unavailable, default motion vector information for the temporal candidate motion vector, wherein the default motion vector information comprises a motion vector amplitude, a prediction direction identifying whether the reference frame precedes or follows the current frame temporally, and a reference index identifying the reference frame; and
means for determining a context for performing a context adaptive lossless statistical decoding based on the determined default motion vector information, wherein the context identifies a coding table to use to decode the video data.

39. The apparatus of claim 35, further comprising:
means for determining that the temporal candidate motion vector for the current portion of the current frame is unavailable;

means for determining whether the reference frame was intra-coded; and means for deriving, in response to determining that the temporal candidate motion vector is unavailable and when the reference frame is determined to be intra-coded, default motion vector information for the temporal candidate motion vector based on spatial motion vectors determined for the portion of the reference frame.

40. The apparatus of claim 35, further comprising:

means for determining that one of the spatial candidate motion vectors is unavailable; and in response to determining that the one of the spatial candidate motion vectors is unavailable, means for determining a default candidate emotion vector that includes default motion vector information for the one of the spatial candidate motion vectors based on a motion vector prediction mode, and wherein the means for pruning the spatial candidate motion vectors to remove duplicate ones of the spatial candidate motion vectors comprises means for pruning the spatial candidate motion vectors that include one or more of the default candidate motion vectors to remove the duplicate ones of the spatial candidate motion vectors, and wherein the means for selecting comprises means for selecting the temporal candidate motion vector, one of the spatial candidate motion vectors remaining after pruning as the selected candidate motion vector comprises selecting the temporal candidate motion vector or one of the spatial candidate motion vectors determined to be unavailable or one of the spatial candidate motion vectors remaining after pruning based on the motion vector predictor (MVP) index signaled in the bitstream.

41. The apparatus of claim 40, wherein the means for determining the default motion vector information comprises means for determining a motion vector amplitude without determining a prediction direction identifying whether the reference frame precedes or follows the current frame temporally or a reference index identifying the reference frame when the motion vector prediction mode is an adaptive motion vector prediction (AMVP) mode.

42. The apparatus of claim 40, wherein the means for determining the default motion vector information comprises means for determining a motion vector amplitude, a prediction direction identifying whether the reference frame precedes or follows the current frame temporally, and a reference index identifying the reference frame when the motion vector prediction mode is a merge mode.

43. The apparatus of claim 40, further comprising means for determining a context for performing a context adaptive lossless statistical decoding based on the determined default motion vector information, wherein the context identifies a coding table to use to decode the video data.

44. The apparatus of claim 35, further comprising:

means for determining that one of the spatial candidate motion vectors is unavailable; and in response to determining that the one of the spatial candidate motion vectors is unavailable, means for removing the one of the spatial candidate motion vectors that is determined to be unavailable from the pruning process, wherein the means for pruning the spatial candidate motion vectors comprises means for pruning only those of the spatial candidate motion vectors that were determined to be available to remove the duplicate ones of the spatial candidate motion vectors without removing a temporal candidate motion vector determined for the current portion of the current video frame or the one of the spatial candidate motion vectors that is determined to be unavailable.

45. The apparatus of claim 35, further comprising means for determining one or more additional spatial candidate motion vectors that are not temporally predicted and that are different from any of the temporal candidate motion vector and the spatial candidate motion vectors remaining after pruning, wherein the means for selecting the temporal candidate motion vector or one of the spatial candidate motion vectors remaining after pruning comprises means for selecting the temporal candidate motion vector, one of the spatial candidate motion vectors remaining after pruning or one of the additional spatial candidate motion vectors as the selected candidate motion vector.

46. An apparatus for decoding video data, the apparatus comprising:

a memory configured to store the video data comprising a current portion of a current video frame; and one or more processors comprising a video decoder configured to:

determine spatial candidate motion vectors associated with the current portion of the current video frame by, at least in part, pruning only the spatial candidate motion vectors to remove duplicate ones of the spatial candidate motion vectors without considering the temporal candidate motion vector during the pruning process, wherein the spatial candidate motion vectors comprise neighbor motion vectors determined for neighboring portions adjacent to the current portion;

select one of a temporal candidate motion vector or one of the spatial candidate motion vectors remaining after pruning as a selected candidate motion vector for a motion vector prediction process based on a motion vector predictor (MVP) index signaled in a bitstream, wherein the temporal candidate motion vector comprises a motion vector determined for a portion of a reference video frame, and wherein the temporal candidate motion vector is a duplicate of one of the spatial candidate motion vectors, and wherein the spatial candidate motion vectors and the determined temporal candidate motion vectors each comprises a vertical component and a horizontal component;

perform motion compensation based on the selected candidate motion vector to predict the current portion of the current video frame; and decode the current portion of the current video frame based on the predicted current portion.

47. The apparatus of claim 46, wherein the motion compensation unit determines a number of candidate motion vectors as the temporal candidate motion vector plus the ones of the spatial candidate motion vectors remaining after pruning, and wherein the video decoder is further configured to parse a coded MVP index from the bitstream based on the determined number of candidate motion vectors, wherein the coded MVP index comprises one of a unary coded MVP index and a truncated unary coded MVP index and decodes the coded MVP index to determine the MVP index.

48. The apparatus of claim 46, wherein the video decoder is further configured to determine that the temporal candidate motion vector for the current portion of the current frame is unavailable, and in response to determining that the temporal candidate motion vector is unavailable, obtain statically configured default motion vector information for the temporal candidate motion vector.

49. The apparatus of claim 46,
wherein the video decoder is further configured to determine that the temporal candidate motion vector for the current portion of the current frame is unavailable, and in response to determining that the temporal candidate motion vector is unavailable, determine default motion vector information for the temporal candidate motion vector, wherein the default motion vector information comprises a motion vector amplitude, a prediction direction identifying whether the reference frame precedes or follows the current frame temporally, and a reference index identifying the reference frame, and
wherein the video decoder is further configured to determine a context for performing a context adaptive lossless statistical decoding based on the determined default motion vector information, wherein the context identifies a coding table to use to decode the video data.

50. The apparatus of claim 46, wherein the video decoder is further configured to determine that the temporal candidate motion vector for the current portion of the current frame is unavailable, and whether the reference frame was intra-coded, and in response to determining that the temporal candidate motion vector is unavailable and when the reference frame is determined to be intra-coded, derives default motion vector information for the temporal candidate motion vector based on spatial motion vectors determined for the portion of the reference frame co-located in the same location of the reference frame as the current portion is in the current frame.

51. The apparatus of claim 46, wherein the video decoder is configured to:
determine that one of the spatial candidate motion vectors is unavailable, in response to determining that the one of the spatial candidate motion vectors is unavailable,
determine a default candidate emotion vector that includes default motion vector information for the one of the spatial candidate motion vectors based on a motion vector prediction mode,
prune the spatial candidate motion vectors that include one or more of the default candidate motion vectors to remove the duplicate ones of the spatial candidate motion vectors, and
select one of the temporal candidate motion vectors, one of the spatial candidate motion vectors determined to be unavailable or one of the spatial candidate motion vectors remaining after pruning based on a motion vector predictor (MVP) index signaled in a bitstream.

52. The apparatus of claim 51, wherein the video decoder is configured to determine a motion vector amplitude without determining a prediction direction identifying whether the reference frame precedes or follows the current frame temporally or a reference index identifying the reference frame when the motion vector prediction mode is an adaptive motion vector prediction (AMVP) mode.

53. The apparatus of claim 51, wherein the video decoder is configured to determine a motion vector amplitude, a prediction direction identifying whether the reference frame precedes or follows the current frame temporally, and a reference index identifying the reference frame when the motion vector prediction mode is a merge mode.

54. The apparatus of claim 51, wherein the video decoder is further configured to determine a context for performing a context adaptive lossless statistical decoding based on the determined default motion vector information, wherein the context identifies a coding table to use to decode the video data.

55. The apparatus of claim 46, wherein the video decoder is configured to:
determine that one of the spatial candidate motion vectors is unavailable,
in response to determining that the one of the spatial candidate motion vectors is unavailable, remove the one of the spatial candidate motion vectors that is determined to be unavailable from the pruning process, and
prune only those of the spatial candidate motion vectors that were determined to be available to remove the duplicate ones of the spatial candidate motion vectors without removing a temporal candidate motion vector determined for the current portion of the current video frame or the one of the spatial candidate motion vectors that is determined to be unavailable.

56. The apparatus of claim 46, wherein the video decoder is further configured to:
determine one or more additional spatial candidate motion vectors that are not temporally predicted and that are different from any of the temporal candidate motion vector and the spatial candidate motion vectors remaining after pruning, and
select the temporal candidate motion vector, one of the spatial candidate motion vectors remaining after pruning or one of the additional spatial candidate motion vectors as the selected candidate motion vector.

57. A non-transitory computer-readable medium comprising instructions that, when executed, cause one or more processors to:
determine spatial candidate motion vectors associated with a current portion of a current video frame by, at least in part, pruning only the spatial candidate motion vectors to remove duplicate ones of the spatial candidate motion vectors without considering the temporal candidate motion vector during the pruning process, wherein the spatial candidate motion vectors comprise motion vectors determined for neighboring portions of the current video frame adjacent to the current portion;
select one of a temporal candidate motion vector or one of the spatial candidate motion vectors remaining after pruning as a selected candidate motion vector for a motion vector prediction process based on a motion vector predictor (MVP) index signaled in a bitstream, wherein the temporal candidate motion vector comprises a motion vector determined for a portion of a reference video frame, and wherein the temporal candidate motion vector is a duplicate of one of the spatial candidate motion vectors, and wherein the spatial candidate motion vectors and the determined temporal candidate motion vectors each comprises a vertical component and a horizontal component;
perform motion compensation based on the selected candidate motion vector to predict the current portion of the current video frame; and
decode the current portion of the current video frame based on the predicted current portion.

* * * * *